(12) United States Patent
Yanagisawa et al.

(10) Patent No.: US 10,845,684 B2
(45) Date of Patent: Nov. 24, 2020

(54) PROJECTOR

(71) Applicant: SEIKO EPSON CORPORATION, Tokyo (JP)

(72) Inventors: Yoshiyuki Yanagisawa, Matsumoto (JP); Ryuta Koizumi, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/142,142

(22) Filed: Sep. 26, 2018

(65) Prior Publication Data
US 2019/0094669 A1   Mar. 28, 2019

(30) Foreign Application Priority Data

Sep. 27, 2017   (JP) .................................. 2017-186773
Jun. 6, 2018    (JP) .................................. 2018-108313

(51) Int. Cl.
  *G03B 21/14*   (2006.01)
  *G03B 21/16*   (2006.01)
  (Continued)

(52) U.S. Cl.
  CPC ........... *G03B 21/145* (2013.01); *G02B 7/008* (2013.01); *G02B 27/10* (2013.01);
  (Continued)

(58) Field of Classification Search
  CPC .. G03B 21/145; G03B 21/16; G03B 21/2037; G02B 7/008; G02B 27/10; G02B 27/1073; G02B 27/149
  (Continued)

(56) References Cited

U.S. PATENT DOCUMENTS 5,282,121 A * 1/1994 Bornhorst ............. F21S 10/007
                                                          362/294
5,805,255 A   9/1998 Mori et al.
                (Continued)

FOREIGN PATENT DOCUMENTS

JP    H8-211357 A    8/1996
JP    H11-282361 A   10/1999
            (Continued)

OTHER PUBLICATIONS

Translation of JP2002131737 (Year: 2019).*
Translation of JP2006106250 (Year: 2019).*

*Primary Examiner* — Jerry L Brooks
(74) *Attorney, Agent, or Firm* — Oliff PLC

(57) ABSTRACT

A projector includes a light source device, a plurality of light modulation devices each adapted to modulate a light beam emitted from the light source device, a light combining device adapted to combine the light beams respectively modulated by the light modulation devices, a projection optical device adapted to project the light beam combined by the light combining device, a housing in which the light modulation devices and the light combining device are disposed, the housing having a first cooling liquid encapsulated inside, a stirring device adapted to stir the first cooling liquid inside the housing, and a control device disposed outside the housing and connected to the housing, the control device adapted to control the light modulation devices. The housing has a connection section connecting the control device and a plurality of light modulation device side signal lines respectively extending from the light modulation devices to each other.

15 Claims, 16 Drawing Sheets

(51) Int. Cl.
  *G03B 21/20* (2006.01)
  *G02B 27/10* (2006.01)
  *G02B 27/14* (2006.01)
  *G02B 7/00* (2006.01)

(52) U.S. Cl.
  CPC ....... *G02B 27/1073* (2013.01); *G02B 27/149* (2013.01); *G03B 21/16* (2013.01); *G03B 21/2073* (2013.01)

(58) Field of Classification Search
  USPC .......................................................... 353/119
  See application file for complete search history.

(56) References Cited

U.S. PATENT DOCUMENTS

| | | | |
|---|---|---|---|
| 8,651,668 | B2 | 2/2014 | Yanagisawa et al. |
| 2003/0098944 | A1* | 5/2003 | Numata ............ G04F 1/133385 349/161 |
| 2007/0153237 | A1* | 7/2007 | Takahashi ............ G03B 21/26 353/29 |
| 2008/0225188 | A1 | 9/2008 | Hoshino et al. |
| 2010/0118279 | A1* | 5/2010 | Itsuki ..................... G03B 21/16 353/54 |
| 2010/0245778 | A1 | 9/2010 | Yanagisawa et al. |
| 2017/0273223 | A1 | 9/2017 | Saito |

FOREIGN PATENT DOCUMENTS

| | | | | |
|---|---|---|---|---|
| JP | 2002-107698 A | | 4/2002 | |
| JP | 2002-131737 A | | 5/2002 | |
| JP | 2002131737 | * | 5/2002 | ............... G02F 1/13 |
| JP | 2002-236277 A | | 8/2002 | |
| JP | 2002-258245 A | | 9/2002 | |
| JP | 2006-017833 A | | 1/2006 | |
| JP | 2006-098759 A | | 4/2006 | |
| JP | 2006-106250 A | | 4/2006 | |
| JP | 2006106250 | * | 4/2006 | ............. G03B 21/16 |
| JP | 2006-330641 A | | 12/2006 | |
| JP | 2006-330642 A | | 12/2006 | |
| JP | 2007-294655 A | | 11/2007 | |
| JP | 2010-224439 A | | 10/2010 | |
| JP | 2012-198401 A | | 10/2012 | |
| JP | 2012-198402 A | | 10/2012 | |
| JP | 5853072 B1 | | 2/2016 | |
| JP | 2016-195215 A | | 11/2016 | |

* cited by examiner

PROJECTOR

BACKGROUND

1. Technical Field

The present invention relates to a projector.

2. Related Art

In the past, there has been known a projector provided with a light source device, a light modulation device for modulating the light emitted from the light source device to thereby form an image corresponding to image information, and a projection optical device for projecting the image formed by the light modulation device in an enlarged manner. As such a projector, there is known a projector in which the light modulation device as a cooling target is cooled with cooling blast (see, e.g., JP-A-2002-107698 (Document 1)).

In the projector described in Document 1, three liquid crystal display elements as the light modulation devices are fixed to a dichroic prism, and a cooling fan is disposed below the three liquid crystal display elements. The cooling blast having been fed from the cooling fan is supplied to a lower side end surface of each of the liquid crystal display elements via an opening part provided to a blast guide plate. Then, the cooling blast flows upward between an incident side surface of each of the liquid crystal elements and a polarization plate located on the light incidence side with respect to each of the liquid crystal display element while drawing heat from the surface of the liquid crystal display element. Thus, each of the liquid crystal display element is cooled.

Further, there is known an electronic apparatus in which a liquid refrigerant is circulated to cool a heat generating body (see, e.g., JP-A-2007-294655 (Document 2)).

The electronic apparatus described in Document 2 is provided with a cooling device for cooling the heat generating body as a cooling target, and the cooling device is provided with a heat receiving section, a heat radiation section, a fan, a tank and a pump, and pipes connecting these constituents to each other to form a circulation channel. Among these constituents, the heat of the heat generating body received by the heat receiving section is transferred to the liquid refrigerant flowing inside the heat receiving section, and is then radiated by the heat radiation section. The fan feeds a gas to the heat radiation section to help the radiation in the heat radiation section. The tank retains the liquid refrigerant, and the pump supplies the heat receiving section with the liquid refrigerant in the tank.

Such a cooling device is further provided with a temperature detection section for detecting the temperature of the liquid refrigerant in the heat generating body or the heat receiving section, and a control section for controlling a flow rate of the liquid refrigerant by the pump based on the temperature detected by the temperature detection section.

Here, in the configuration described in Document 1 and Document 2 mentioned above, there is a problem that it is difficult to effectively cool the cooling target in the case in which the temperature of the cooling target is high.

For example, in the configuration described in Document 1 mentioned above, since the heat transfer coefficient of the air is not so high, it is difficult to sufficiently cool the cooling target. In addition, in the present configuration, there arises a problem that a noise such as a wind noise is apt to be generated.

Further, for example, in the configuration described in Document 2 mentioned above, it is arranged that the heat of the cooling target is transferred to the heat receiving section via a connection region with the heat receiving section, and is further transferred to the liquid refrigerant. As described above, since the cooling target is indirectly cooled, it is necessary to provide a large contact area between the cooling target and the heat receiving section in order to effectively cool the cooling target, and there is a problem that the cooling device is apt to grow in size.

Therefore, there has been demanded a configuration capable of more effectively cooling the cooling target.

SUMMARY

An advantage of some aspects of the invention is to provide a projector in which the cooling target can effectively be cooled.

A projector according to an aspect of the invention includes a light source device, a plurality of light modulation devices each adapted to modulate a light beam emitted from the light source device, a light combining device adapted to combine the light beams respectively modulated by the plurality of light modulation devices, a projection optical device adapted to project the light beam combined by the light combining device, a housing in which the plurality of light modulation devices and the light combining device are disposed, the housing having a first cooling liquid encapsulated inside, a stirring device adapted to stir the first cooling liquid inside the housing, and a control device disposed outside the housing, connected to the housing, the control device adapted to control the plurality of light modulation devices, and the housing has a connection section connecting the control device and a plurality of light modulation device side signal lines respectively extending from the plurality of light modulation devices to each other.

According to such a configuration, the plurality of light modulation devices to be the cooling target is dipped in the first cooling liquid encapsulated in the housing, and is thus cooled. Thus, the plurality of light modulation devices is directly cooled by the first cooling liquid. Further, since the first cooling liquid is stirred by the stirring device, it is possible to prevent the first cooling liquid to which the heat of the light modulation devices is transferred, and which rises in temperature from being retained around the light modulation devices. Therefore, it is possible to effectively cool the plurality of light modulation devices compared to the case of cooling the plurality of light modulation devices with cooling blast, or the case of indirectly cooling the plurality of light modulation devices with the cooling liquid.

Further, since the control device for controlling the plurality of light modulation devices is disposed outside the housing, it is possible to prevent the heat generated in the control device from affecting the first cooling liquid.

Further, the housing has a connection section adapted to connect a plurality of light modulation device side signal lines respectively extending from the plurality of light modulation devices and the control device to each other. According to this configuration, it is possible to make it easy to connect the control device located outside the housing and the plurality of light modulation devices located inside the housing to each other.

In the aspect of the invention described above, it is preferable that the connection section includes a plurality of first connection sections respectively connected to the plurality of light modulation device side signal lines, and a second connection section electrically connected to the plurality of first connection sections, the second connection section connected to a control device side signal line extending from the control device.

According to such a configuration, by connecting the plurality of light modulation device side signal lines extending from the plurality of light modulation devices to the plurality of first connection sections, and connecting the control device side signal line extending from the control device to the second connection section, it is possible to reliably connect the plurality of light modulation devices and the control device located inside and outside the housing to each other. Therefore, it is possible to easily and surely achieve the connection between the light modulation devices and the control device.

In the aspect of the invention described above, it is preferable to further include a first pipe connected to the housing, the first pipe through which the first cooling liquid flows, a first retaining section disposed outside the housing, the first retaining section adapted to retain the first cooling liquid inflowing via the first pipe, a first heat receiving section disposed outside the housing, the first heat receiving section adapted to receive heat from the first cooling liquid inflowing via the first pipe, and a first pressure-feeding section disposed outside the housing, the first pressure-feeding section adapted to pressure-feed the first cooling liquid inflowing via the first pipe toward the housing.

According to such a configuration, since the first cooling liquid is retained in the first retaining section via the first pipe, and is then pressure-fed into the housing by the first pressure-feeding section, it is possible to prevent the first cooling liquid from getting short in the housing. Therefore, it is possible to make it easy to fill the housing with the first cooling liquid.

Further, since the first heat receiving section receives the heat of the first cooling liquid inflowing via the first pipe, it is possible to supply the first cooling liquid having been cooled to the housing. Therefore, since it is possible to cool the first cooling liquid in the outside of the housing, it is possible to more effectively cool the plurality of light modulation devices described above to be cooled by the first cooling liquid.

In the aspect of the invention described above, it is preferable to further include an external housing surrounding the housing and having a space with positive pressure inside.

According to such a configuration, since the space inside the external housing is provided with the positive pressure, it is possible to prevent the first cooling liquid located inside the housing from being leaked from the housing surrounded by the external housing. Therefore, it is possible to keep the state in which the plurality of light modulation devices is dipped in the first cooling liquid.

In the aspect of the invention described above, it is preferable that a second cooling liquid is encapsulated in the space between the housing and the external housing.

According to such a configuration, since the housing to which the heat of the first cooling liquid is transferred can be cooled by the second cooling liquid, it is possible to indirectly cool the first cooling liquid. Therefore, it is possible to more effectively cool the plurality of light modulation devices dipped in the first cooling liquid.

In the aspect of the invention described above, it is preferable that a heat transfer coefficient of the second cooling liquid is higher than the heat transfer coefficient of the first cooling liquid.

According to such a configuration, it is possible to make it easy to transfer the heat of the first cooling liquid having direct contact with the plurality of light modulation devices described above to the second cooling liquid via the housing. Therefore, it is possible to make the temperature of the first cooling liquid lower, and by extension, it is possible to more effectively cool the plurality of light modulation devices.

In the aspect of the invention described above, it is preferable to further include a second pipe connected to the external housing, the second pipe through which the second cooling liquid flows, a second retaining section disposed outside the external housing, the second retaining section adapted to retain the second cooling liquid inflowing via the second pipe, a second heat receiving section disposed outside the external housing, the second heat receiving section adapted to receive heat from the second cooling liquid inflowing via the second pipe, and a second pressure-feeding section disposed outside the external housing, the second pressure-feeding section adapted to pressure-feed the second cooling liquid inflowing via the second pipe toward the external housing.

According to such a configuration, it is possible to cool the second cooling liquid encapsulated in the space in the external housing in the outside of the external housing and the housing similarly to the configuration described above. Therefore, it is possible to make the temperature of the first cooling liquid lower, and by extension, it is possible to more effectively cool the plurality of light modulation devices described above.

In the aspect of the invention described above, it is preferable that the housing has a restriction section adapted to restrict inflow of the first cooling liquid between the light combining device and the projection optical device.

Here, when the temperature of the liquid varies, the density of the liquid varies, and thus, the refractive index of the liquid varies. Therefore, if the uneven temperature distribution occurs in the first cooling liquid flowing between the light modulation devices and the projection optical device, the uneven refractive index distribution occurs. Therefore, the variation in size of the pixel or the displacement of the central position of the pixel occurs, or these occur in a complex manner in the image projected by the projection optical device to be displayed. Such a phenomenon is called a resolution unevenness.

Such a resolution unevenness is more conspicuously confirmed in the case in which the uneven refractive index distribution occurs in the liquid flowing at a position distant from the light modulation devices between the light modulation devices and the projection device. In other words, the resolution unevenness is more conspicuously observed in the case in which the uneven refractive index distribution described above occurs in the liquid flowing at a position closer to the projection optical device.

In contrast, according to the configuration described above, since the housing has the restriction section for preventing the first cooling liquid from flowing between the light combining device and the projection optical device, the projector is configured so that the first cooling liquid does not flow in the region closest to the projection optical device (in detail, the plane of incidence of light in the projection optical device). Therefore, even in the case in which the uneven refractive index distribution described above occurs in the first cooling liquid, it is possible to prevent the resolution unevenness described above from being observed.

In the aspect of the invention described above, it is preferable that there is further included an optical component located between the light combining device and a target light modulation device of the plurality of light modulation devices, the optical component which the light emitted from the target light modulation device enters, the housing includes a first flow channel in which the first cooling liquid flows along the target light modulation device and the optical component between the target light modulation device and the optical component, and a second flow channel in which the first cooling liquid flows along the optical component and the light combining device between the optical component and the light combining device, and a dimension in the second flow channel between the optical component and the light combining device along a light path of the light emitted from the target light modulation device is smaller than a dimension in the first flow channel between the target light modulation device and the optical component along the light path.

It should be noted that as the optical component described above, there can be cited an emission side polarization plate, a view angle compensation plate, and an optical filter each disposed on the light emission side with respect to the light modulation device.

Here, in the case in which the cooling liquid in which the uneven refractive index distribution occurs flows so as to cross the proceeding direction of the light passing through the light modulation device, the resolution unevenness described above is conspicuously confirmed as the position of the flow channel of the cooling liquid gets away from the light modulation device. On the other hand, the resolution unevenness is conspicuously observed as the flow channel width (the dimension in the direction along the light path described above in the flow channel of the cooling liquid; liquid thickness) of the cooling liquid increases.

In contrast, in the configuration described above, the flow channel width of the second flow channel is smaller than the flow channel width of the first flow channel. Therefore, it is possible to prevent the resolution unevenness from being observed compared to the case in which the flow channel width of the second flow channel is larger than flow channel width of the first flow channel.

Besides the above, in the case in which the flow speeds of the first cooling liquid in the first flow channel and the second flow channel are the same, the flow rate of the first cooling liquid flowing through the first flow channel becomes higher than the flow rate of the first cooling liquid flowing through the second flow channel. Therefore, it is possible to make the flow rate of the first cooling liquid flowing along the target light modulation device higher than the flow rate of the first cooling liquid flowing along the optical component described above. Therefore, it is possible to make it easy to cool the target light modulation device.

In the aspect of the invention described above, it is preferable that in a case in which, in each of the plurality of light modulation devices, a region adapted to modulate light corresponding to an area on a one-end side of an entering light beam in a direction is defined as a one-end side region, the entering light beam entering the projection optical device from the light combining device, the direction being perpendicular to a proceeding direction of the entering light beam and being parallel to a proceeding direction of at least one of the light beams which enter each of the plurality of light modulation devices, and in a case in which, in each of the plurality of light modulation devices, a region adapted to modulate light corresponding to an area on a the-other-end side of the entering light beam is defined as a the-other-end side region, a flow direction of the first cooling liquid flowing along a surface on a light incidence side in each of the plurality of light modulation devices is substantially the same among the plurality of light modulation devices in a direction of connecting the one-end side region and the the-other-end side region to each other.

Here, as described above, since the liquid varies in refractive index with the temperature, when the cooling liquid flows along the surface on the light incidence side of the light modulation device, the temperature of the cooling liquid on the downstream side becomes higher than the temperature of the cooling liquid on the upstream side in the flow channel of the cooling liquid to cause the uneven refractive index distribution in the cooling liquid. Therefore, when the light beam having passed through the cooling liquid enters the light modulation device, the illuminance unevenness occurs in the light modulation device.

On this occasion, if there is adopted a configuration in which the light beam modulated by one of the plurality of light modulation devices is reversed and combined with the light beam modulated by another light modulation device, the illuminance distribution by the colored light beam having passed through the one of the plurality of light modulation devices and the illuminance distribution by the colored light beam having passed through the another light modulation device are opposite to each other, and the illuminance unevenness is observed in the image projected by the projection optical device to be displayed.

In contrast, the flow direction of the first cooling liquid flowing along the surface on the light incidence side described above is substantially the same among the light modulation devices in the direction of connecting the one-end side region described above and the the-other-end side region described above to each other. According to this configuration, the modulated light beams modulated by the respective light modulation devices enter the projection optical device as the modulated light beams having the same illuminance distribution. Therefore, in the case of modulating the colored light beams different from each other by the light modulation devices, it is possible to prevent the image in which illuminance unevenness occurs between the colors from being projected, and thus, it is possible to prevent the illuminance unevenness described above from being observed.

In the aspect of the invention described above, it is preferable that in a case in which, in each of the plurality of light modulation devices, a region adapted to modulate light corresponding to an area on a one-end side of an entering light beam in a direction is defined as a one-end side region, the entering light beam entering the projection optical device from the light combining device, the direction being perpendicular to a proceeding direction of the entering light beam and being parallel to a proceeding direction of at least one of the light beams which enter each of the plurality of light modulation devices, and in a case in which, in each of the plurality of light modulation devices, a region adapted to modulate light corresponding to an area on a the-other-end side of the entering light beam is defined as a the-other-end side region, a flow direction of the first cooling liquid flowing along a surface on a light emission side in each of the plurality of light modulation devices is substantially the same among the plurality of light modulation devices in a direction of connecting the one-end side region and the the-other-end side region to each other.

Here, as described above, since the liquid varies in refractive index with the temperature, when the cooling liquid flows along the surface on the light emission sloe of the light modulation device, the uneven refractive index distribution occurs in the cooling liquid. Therefore, when the light beam (the modulated light) having been emitted from the light modulation device passes through the cooling liquid, the resolution unevenness described above occurs in the image displayed.

On this occasion, if there is adopted a configuration in which the light beam modulated by one of the plurality of light modulation devices is reversed and combined with the light beam modulated by another light modulation device, the distribution of the resolution unevenness caused by the modulated light of the one of the plurality of light modulation devices and the distribution of the resolution unevenness caused by the modulated light of the another light modulation device are opposite to each other, and the resolution unevenness is observed in the image displayed.

In contrast, the flow direction of the first cooling liquid flowing along the surface on the light emission side described above is substantially the same among the light modulation devices in the direction of connecting the one-end side region described above and the the-other-end side region described above to each other. According to this configuration, the modulated light beams having been modulated by the respective light modulation devices and then having passed through the first cooling liquid enter the projection optical device as the modulated light beams having the same resolution unevenness distribution. Therefore, in the case of modulating the colored light beams different from each other by the light modulation devices, it is possible to prevent the image different in resolution unevenness between the colors from being projected, and thus, it is possible to prevent the resolution unevenness described above from being observed.

In the aspect of the invention described above, it is preferable that a flow speed of the first cooling liquid flowing along each of the plurality of light modulation devices is substantially the same among the plurality of light modulation devices.

According to such a configuration, since the flow rates of the first cooling liquid flowing along the respective light modulation devices are substantially the same as each other, it is possible to make the cooling efficiency of the respective light modulation devices coincide with each other. Therefore, it is possible to evenly cool the light modulation devices.

Further, according to this configuration, the illuminance distribution described above and the distribution of the resolution unevenness described above can be made to substantially coincide with each other. Therefore, it is possible to prevent the illuminance unevenness and the resolution unevenness from being observed in the image projected.

In the aspect of the invention described above, it is preferable that the first cooling liquid flows on a light incidence side and a light emission side of each of the plurality of light modulation devices, and a flow direction of the first cooling liquid flowing on the light incidence side of each of the plurality of light modulation devices is opposite to a flow direction of the first cooling liquid flowing on the light emission side of each of the plurality of light modulation devices.

According to this configuration, the upstream side in the flow direction of the first cooling liquid flowing on the light incidence side with respect to one of the light modulation devices and the upstream side in the flow direction of the first cooling liquid flowing on the light emission side with respect to that light modulation device are opposite to each other in the case of viewing that light modulation device along the proceeding direction of the incident light. In other words, in one of the light modulation devices, the region along which the first cooling liquid lower in temperature flows is located on the side reversed between the light incidence side and the light emission side. Therefore, it is possible for the first cooling liquid to substantially evenly cool that light modulation device. Therefore, since each of the light modulation devices can evenly be cooled, it is possible to effectively cool these light modulation devices.

In the aspect of the invention described above, it is preferable that the first cooling liquid is a fluorine-based inert fluid.

Here, as the fluorine-based inert fluid, there can be used, for example, Fluorinert (a trademark of 3M Company) or NOVEC (a trademark of 3M Company).

According to such a configuration, it is possible to make the light modulation devices as electronic components operate in the state of being dipped in the first cooling liquid. Therefore, it is possible to operate the light modulation devices while cooling the light modulation devices, and thus, it is possible to stably operate the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
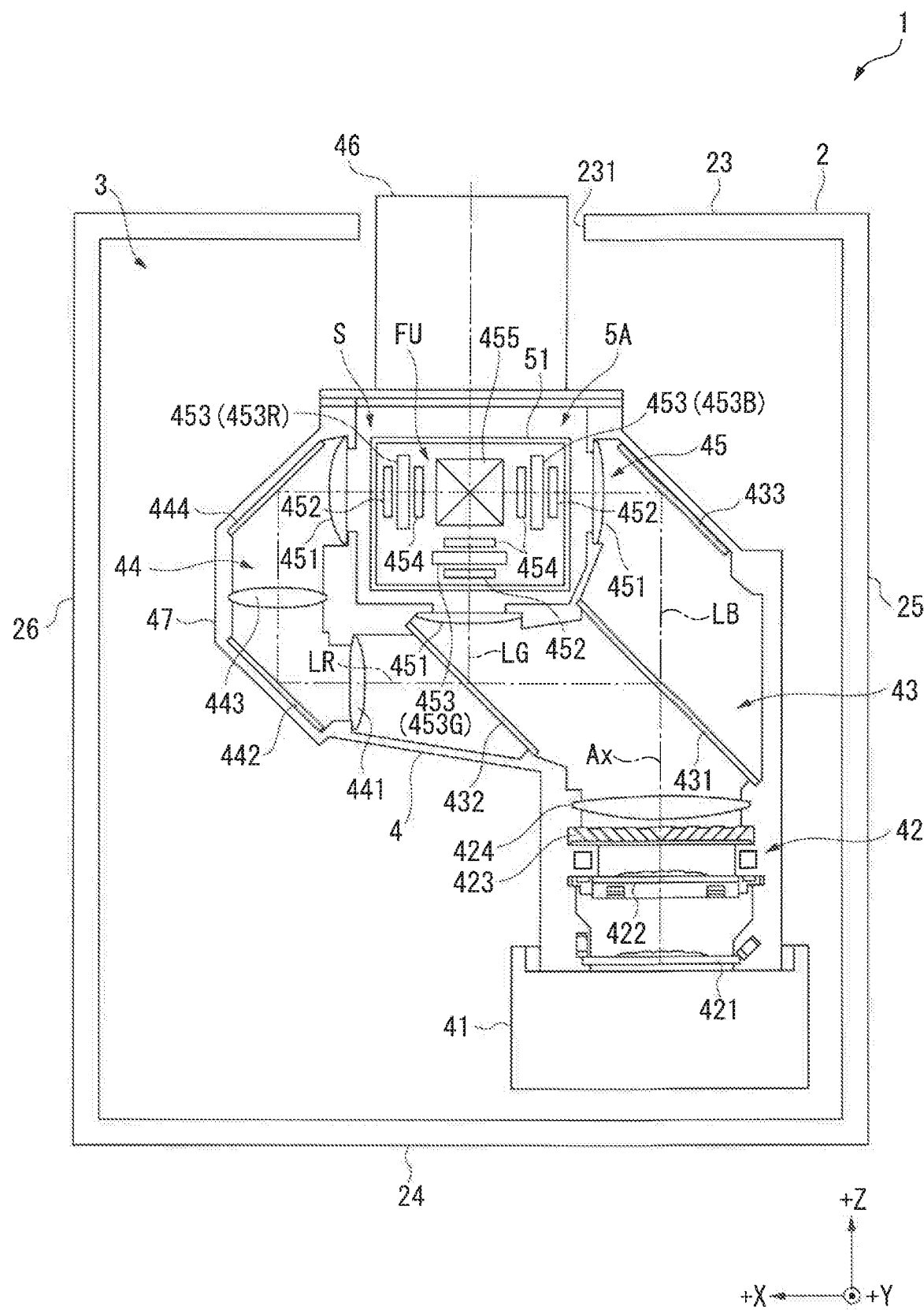
FIG. 1 is a schematic diagram showing a configuration of a projector according to a first embodiment of the invention.

A first embodiment of the invention will hereinafter be described based on the accompanying drawings.
Schematic Configuration of Projector
FIG. 1 is a schematic diagram showing a configuration of a projector 1 according to the present embodiment.

The projector 1 according to the present embodiment is a projection type display device for modulating the light having been emitted from a light source device 41 disposed inside to thereby from an image corresponding to image information, and then projecting the image on a projection target surface such as a screen in an enlarged manner. As shown in FIG. 1, the projector 1 is provided with an exterior housing 2 forming an exterior appearance, and a device main body 3 housed inside the exterior housing 2. Although described later in detail, such a projector 1 has one of the features in the configuration of a cooling device 5A for cooling a cooling target.

Hereinafter, a configuration of the projector 1 will be described in detail.
Configuration of Exterior Housing The exterior housing 2 is formed to have a substantially rectangular solid shape. The exterior housing 2 has a front surface part 23, a back surface part 24, a right side surface part 25, and a left side surface part 26, and in addition has a top surface part for connecting one end side of these surface parts 23 through 26 and a bottom surface part for connecting the other end side of these surface parts 23 through 26, although not shown in the drawings. It should be noted that the bottom surface part is a surface opposed to an installation surface of the projector 1, and is provided with a plurality of legs.

Further, the front surface part 23 has an opening section 231. A part of a projection optical device 46 described above is exposed via the opening section 231, and the image is projected by the projection optical device 46.
Configuration of Device Main Body The device main body 3 is provided with an image projection device 4 and the cooling device 5A. Further, although not shown in FIG. 1, the device main body 3 is provided with a control device 6 (see FIG. 3) for controlling an operation of the projector 1, and a power supply device for supplying electronic components constituting the projector 1 with electrical power.
Configuration of Image Projection Device The image projection device 4 forms the image corresponding to image information (including an image signal) input from the control device 6, and then projects the image on the projection target surface. The image projection device 4 is provided with a light source device 41, a homogenizing device 42, a color separation device 43, a relay device 44, an image forming device 45, a projection optical device 46, and an optical component housing 47.

The light source device 41 emits illumination light to the homogenizing device 42. As a configuration of such a light source device 41, there can be cited a configuration having a solid-state light source such as a laser diode (LD) for emitting blue light as excitation light, and a wavelength conversion element for converting the wavelength of a part of the blue light out of the blue light having been emitted from the solid-state light source into the wavelengths of the fluorescence including green light and red light. It should be noted that as another configuration of the light source device 41, there can be cited a configuration having a light source lamp such as a super-high pressure mercury lamp as the light source, or a configuration having another solid-state light source such as a light emitting diode (LED).

The homogenizing device 42 homogenizes the illuminance in a plane perpendicular to the central axis of the light beam entering the homogenizing device 42 from the light source device 41. The homogenizing device 42 is provided with a first lens array 421, a second lens array 422, a polarization conversion element 423, and a superimposing lens 424. It should be noted that the homogenizing device 42 can further be provided with a dimming device for blocking a part of the transmitted light beam to control the intensity of the transmitted light.

Among these constituents, the polarization conversion element 423 uniforms the light beam entering the polarization conversion element 423 from the second lens array 422 into unique linearly polarized light and then emits the result.

The color separation device 43 separates the red light LR, the green light LG, and the blue light LB from the light beam entering the color separation device 43 from the homogenizing device 42. The color separation device 43 has a dichroic mirror 431 for reflecting the red light LP and the green light LB and transmitting the blue light LE, a dichroic mirror 432 for transmitting the red light LR and reflecting the green light LG, and a reflecting mirror 433 for reflecting the blue light LB thus separated toward a field lens 451 for the blue color described later. It should be noted that the green light LG having been reflected by the dichroic mirror 432 enters the field lens 451 for the green color.

The relay device 44 is provided with an incident side lens 441, a reflecting mirror 442, a relay lens 443 and a reflecting mirror 444 disposed on the light path of the red light LR thus separated, and guides the red light LR to the field lens 451 for the red color. It should be noted that it is assumed in the present embodiment that the image projection device 4 is provided with a configuration of transmitting the red light LR to the relay device 44, but the configuration is not a limitation, and the image projection device 4 can also be provided with, for example, a configuration of transmitting the blue light LB.

The image forming device 45 modulates the incident light for each of the colored light beams entering the electro-optic device 75 for each colored light beam, and then combines the colored light beams thus modulated with each other to form an image corresponding to the image information described above. The image forming device 45 is provided with the field lenses 451, incident side polarization plates 452, light modulation devices 453, emission side polarization plates 454 disposed corresponding respectively to the three colored light beams LR, LG, and LB described above, and a single light combining device 455.

Among these constituents, the light modulation devices 453 (the light modulation devices corresponding to the colored light beams of red, green, and blue are denoted by 453R, 453G, and 453B) are each configured including a transmissive liquid crystal panel having a plane of incidence of light and a light emission surface different from each other in the present embodiment.

The light combining device 455 combines the colored light beams having been modulated by the respective light modulation devices 453 and then transmitted through the respective emission side polarization plates 454. In the present embodiment, the light combining device 455 is formed of a cross-dichroic prism having a substantially rectangular solid shape, and has the three planes of incidence of light 455B, 455G, and 455R (see FIG. 2) which the colored light beams having been modulated by the respective light modulation devices 453 respectively enter, and a single light emission surface 455E (see FIG. 2) from which the image light (the light forming the image) obtained by combining these colored light beams with each other. The image light having been emitted from the light emission surface 455E enters the projection optical device 46.

The three light modulation devices 453 and the three emission side polarization plates 454 constituting such an image forming device 45 are held by a holding member not shown to the corresponding planes of incidence of light 455B, 455G, and 455R in the light combining device 455, and are integrated with each other.

It should be noted that in the following description, the incident side polarization plates 452, the light modulation devices 453, the emission side polarization plates 454 and the light combining device 455 are called an image forming unit FU. The image forming unit FU is disposed inside a housing 51 of the cooling device 5A described later.

The projection optical device 46 projects the image light entering the projection optical device 46 from the light combining device 455 on the projection target surface in an enlarged manner to thereby display the image formed by the image light on the projection target surface. The projection optical device 46 is configured as a combination lens having a plurality of lenses arranged in a lens barrel.

The optical component housing 47 holds the devices 42 through 44 described above and the field lenses 451.

Here, to the image projection device 4, there is set an illumination optical axis Ax as the design optical axis, and the optical component housing 47 holds the devices 42 through 44 and the field lenses 451 at predetermined positions on the illumination optical axis Ax. The optical component housing 47 is provided with a space S formed at a position surrounded in three directions by the field lenses 451, wherein the image forming unit FU and the housing 51 of the cooling device 5A are disposed in the space S.

Further, the light source device 41 and the projection optical device 46 are disposed at predetermined positions on the illumination optical axis Ax.

In the following description, a direction from the back surface part 24 toward the front surface part 23 is defined as a +Z direction, and directions crossing the +Z direction and crossing each other are defined as a +X direction and a +Y direction. Among the +X direction and the +Y direction, the +X direction is defined as a direction from the left side surface part 25 toward the right side surface part 26, and the +Y direction is defined as a direction from the bottom surface part toward the top surface part. In other words, the +Z direction is a direction in which the projection optical device 46 projects the image light along the central axis of the projection optical device 46 in the case of being viewed from the +Y direction side. Further, although not shown in the drawings, an opposite direction to the +Z direction is defined as a −Z direction. The same applies to a −X direction and a −Y direction. It should be noted that in the present embodiment, the +X direction, the +Y direction and the +Z direction are defined as directions perpendicular to each other.

Configuration of Cooling Device

Figure 2:
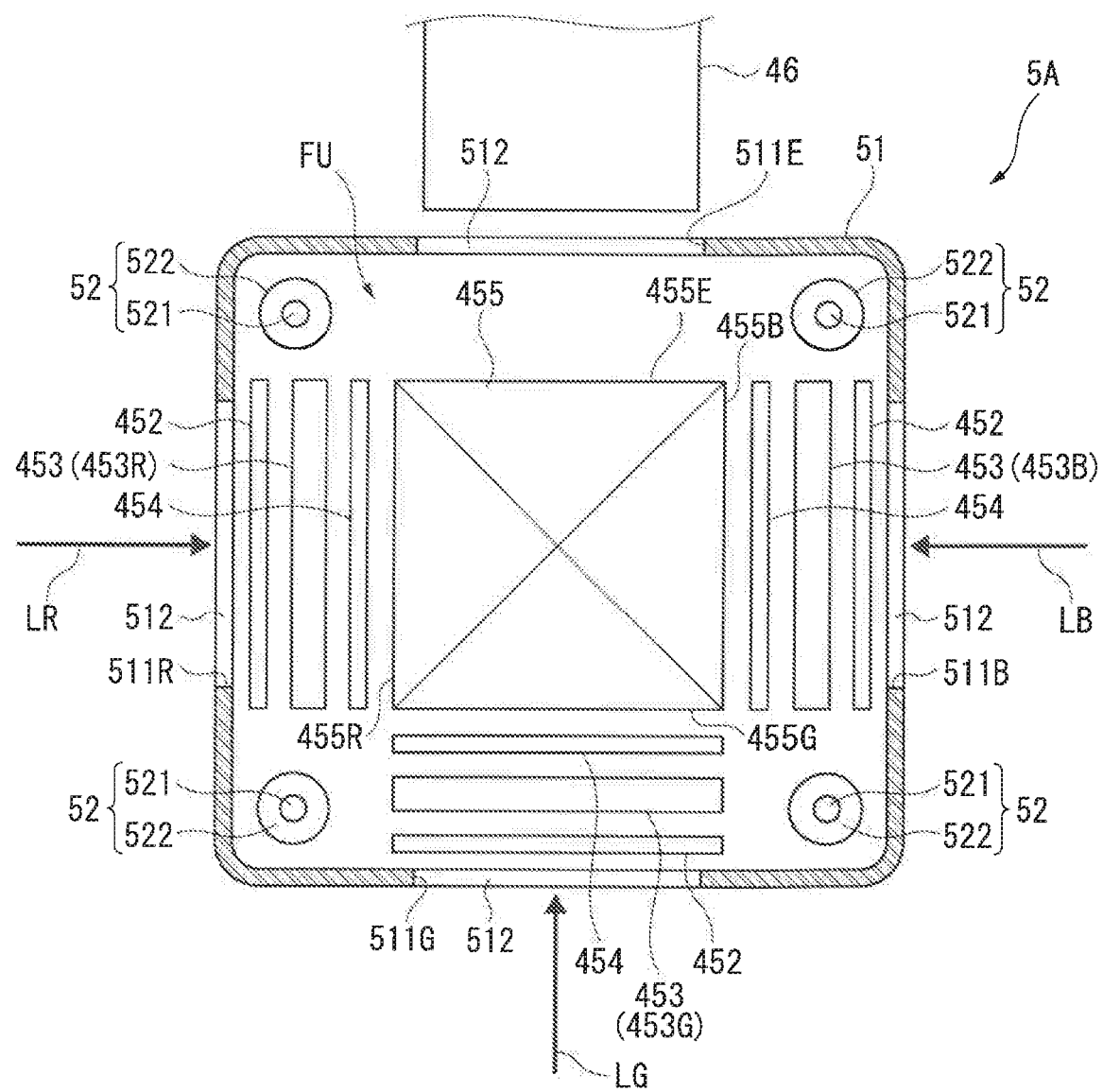
FIG. 2 is a schematic diagram showing a configuration of a cooling device in the first embodiment mentioned above.

FIG. 2 is a schematic diagram showing a configuration of the cooling device 5A, and is a diagram schematically showing a cross-section of the cooling device 5A viewed along the X-Z plane.

The cooling device 5A cools the image forming unit FU as one of the cooling targets of the projector 1. As shown in FIG. 1 and FIG. 2, the cooling device 5A has the housing 51 disposed in the space S described above, and in addition has a stirring device 52 as shown in FIG. 2.

Configuration of Housing

As shown in FIG. 2, the housing 51 is a housing in which the image forming unit FU is disposed inside, and is formed to have a substantially rectangular solid shape. The housing 51 has opening sections 511B, 511G, 511R, and 511E in the respective side surface parts different from each other.

The opening sections 511B, 522G, and 511R are formed at positions opposed to the surfaces on the light incidence side of the incident side polarization plates 452 which the respectively corresponding colored light beams enter. These opening sections 511B, 511G, and 511R are opening sections which the blue light LB, the green light LB and the red light LR having been transmitted through the respectively corresponding field lenses 451 (see FIG. 1) pass through.

The opening section 511E is formed at a position opposed to the light emission surface 455E of the light combining device 455. The opening section 511E is an opening section which the image light described above having been emitted from the light emission surface 455E passes through.

In each of these opening sections 511B, 511G, 511R, 511E, there is fitted a light transmissive member 512, and each of these opening sections 511B, 511G, 511R, 511E is closed with the light transmissive member 512.

Such a housing 51 is configured as a sealed housing in which the cooling liquid (a first cooling liquid) is encapsulated. Therefore, the inside of the housing 51 is filled with the cooling liquid, and the image forming unit FU described above is dipped in the cooling liquid. It should be noted that the sealed housing includes a simplified sealed structure as long as the cooling liquid inside the housing 51 is prevented from being leaked outside the housing 51 such as a structure in which some of the side surface parts of the housing 51 is detachably attached via a packing or the like.

Further, as the cooling liquid, there can be used an inert fluid (in particular, a fluorine-based inert fluid) not affecting the operation of the light modulation devices 453 which are supplied with the electrical power and the image information and are then driven. As such an inert fluid, there can be adopted, for example, Fluorinert (a trademark of 3M Company) or NOVEC (a trademark of 3M Company).

Configuration of Stirring Device

The stirring device 52 is for stirring the cooling liquid in the housing 51 to flow the cooling liquid inside the housing 51 to thereby make the cooling liquid flow along the image forming unit FU. In the present embodiment, the stirring device 52 has a motor (not shown), a shaft 521 rotated by the motor, and an impeller 522 disposed on the outer circumference of the shaft 521. According to such a configuration, it is possible to dispose the shaft 521 and the impeller 522 for stirring the cooling liquid inside the housing 51, and dispose the motor to be a heat generation source outside the housing 51. In this case, the temperature of the cooling liquid can be prevented from rising due to the stirring device 52. However, the configuration of the stirring device 52 is not limited to the configuration described above.

In the present embodiment, there are disposed a plurality of shafts 521 and a plurality of impellers 522 in dead spaces in the housing 51. Specifically, the shafts 521 and the impellers 522 are respectively disposed in four corner parts where the image light entering the projection optical device 46 hardly passes through in the housing 51 having a substantially square shape in the case of viewing the housing 51 from the +Y direction side.

Specifically, the shafts 521 and the impellers 522 provided to the two stirring devices 52 out of the four stirring devices 52 are disposed at positions across the light modulation device 453B in the +Z direction from each other, and the shafts 521 and the impellers 522 provided to the other two stirring devices 52 are disposed at positions across the light modulation device 453R in the +Z direction from each other. In other words, the shafts 521 and the impellers 522 provided to the two stirring devices 52 out of the four stirring devices 52 are disposed at positions across the light modulation device 453G in the +X direction from each other, and the shafts 521 and the impellers 522 provided to the other two stirring devices 52 are disposed at positions across the light emission surface 455E of the light combining device 455 in the +X direction from each other. It should be noted that this is not a limitation, and the positions and the number of the stirring devices 52 can arbitrarily be modified.

In such a cooling device 5A, when the stirring devices 52 are driven, the cooling liquid in the housing 51 flows between the inner surfaces of the housing 51 and the incident side polarization plates 452, between the incident side polarization plates 452 and the light modulation devices 453, between the light modulation devices 453 and the emission side polarization plates 454, and between the emission side polarization plates 454 and the light combining device 455 along these constituents. Thus, the incident side polarization plates 452, the light modulation devices 453 and the emission side polarization plates 454 are cooled.

It should be noted that the flow speeds of the cooling liquid flowing along the incident side polarization plates 452 are substantially the same, the flow speeds of the cooling liquid flowing along the light modulation devices 453 are substantially the same, and the flow speeds of the cooling liquid flowing along the emission side polarization plates 454 are substantially the same. For example, the flow speed of the cooling liquid flowing along the light modulation device 453B, the flow speed of the cooling liquid flowing along the light modulation device 453G, and the flow speed of the cooling liquid flowing along the light modulation device 453R are substantially the same as each other. Therefore, the incident side polarization plates 452 are cooled at substantially the same cooling efficiency, the light modulation devices 453 are cooled a substantially the same cooling efficiency, and the emission side polarization plates 454 are cooled at substantially the same cooling efficiency. However, this is not a limitation, and the flow speed of the cooling liquid flowing along, for example, a constituent which is apt to become high in temperature, or a constituent which is easily deteriorated by heat is made higher than that of the cooling liquid flowing along the other constituents.

Figure 3:
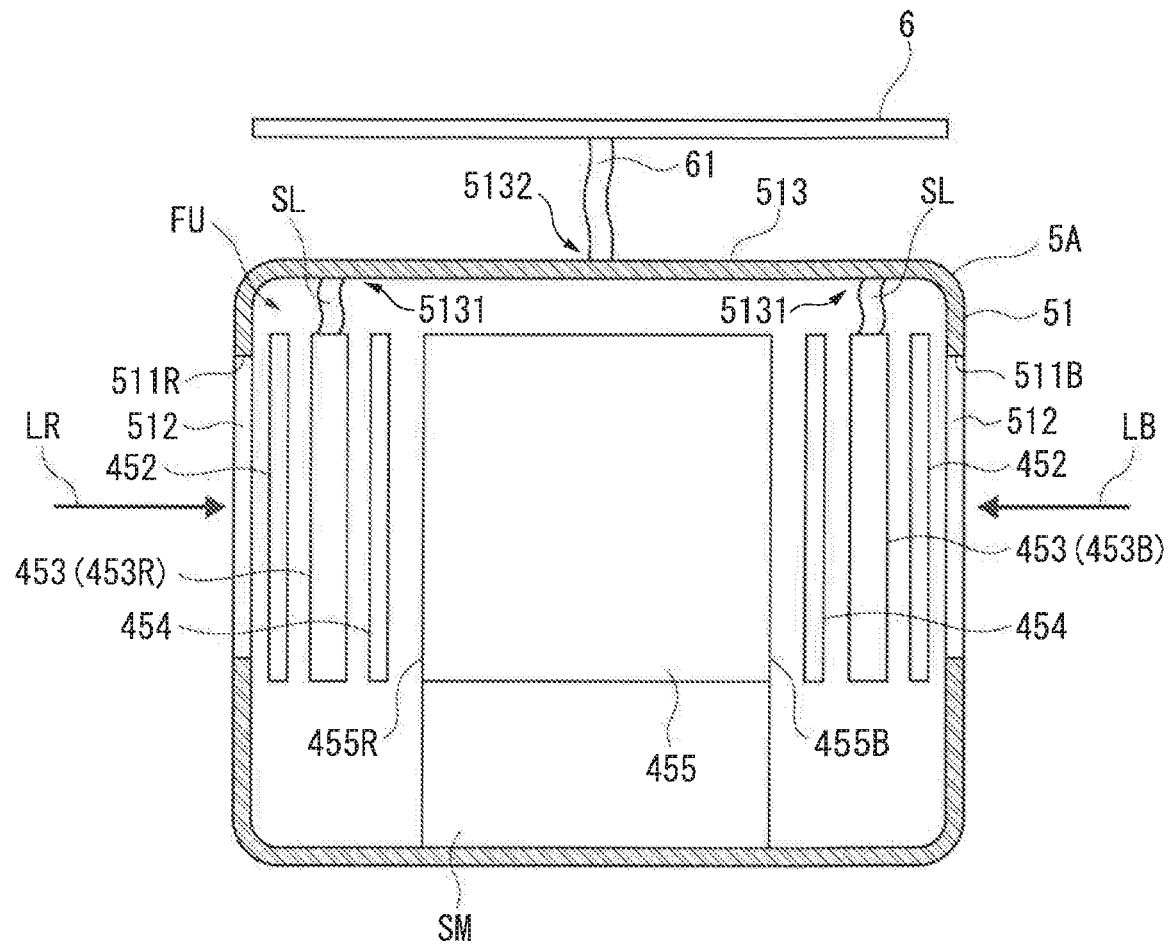
FIG. 3 is a schematic diagram showing the configuration of the cooling device in the first embodiment mentioned above.

FIG. 3 is a diagram schematically showing a cross-section of the cooling device 5A along the X-Y plane. It should be noted that in FIG. 3, a support section SM disposed inside the housing 51 to support the light combining device 455 is shown.

Here, as shown in FIG. 3, the side surface part 513 located on the +Y direction side with respect to the image forming unit FU in the housing 51 has three first connection sections 5131 to which three signal lines SL (light modulation device side signal lines) extending from the respective light modulation devices 453 toward the +Y direction are respectively connected in the inside of the housing 51.

The side surface part 513 further has a single second connection section 5132 to which a signal line 61 (a control device side signal line) extending from the control device 6 located on the +Y direction side with respect to the housing 51 is connected in the outside of the housing 51. It should be noted that in the present embodiment, the control device 6 is disposed outside the housing 51 and is connected to the housing 51.

Although not shown in the drawings, the plurality of first connection sections 5131 and the second connection section 5132 are electrically connected to the side surface part 513 via cables or a board provided to the side surface part 513. In other words, the housing 51 has the side surface part 513 as a connection section for connecting the plurality of signal lines 61 extending from the respective light modulation devices 453 and the control device 6 to each other. Further, the side surface part 513 has the plurality of first connection sections 5131 and the second connection section 5132.

It should be noted that as described above, the control device 6 controls the whole of the projector 1. For example, the control device 6 supplies the image information (image signal) and the drive power to each of the light modulation devices 453 via the signal lines 61 to control the operation of each of the light modulation devices 453, and thus, makes each of the light modulation devices 453 form the image corresponding to the image information.

Further, since the housing 51 has the first connection sections 5131 described above and the second connection section 5132, it is possible to separate the control device 6 which becomes a heat source when driving the projector 1 from the cooling device 5A (the housing 51), and thus, it is prevented that the heat of the control device 6 is transferred to the inside of the housing 51 to raise the temperature of the cooling liquid. Besides the above, it is possible to easily achieve the connection between the light modulation devices 453 disposed inside the housing 51 and the control device 6 without the leakage of the cooling liquid to the outside of the housing 51.

Advantages of First Embodiment

The projector 1 described hereinabove is capable of exerting the following advantages.

The image forming unit FU including the plurality of light modulation devices 453 is dipped in the cooling liquid encapsulated in the housing 51, and is directly cooled by the cooling liquid. Since the cooling liquid is stirred by the stirring devices 52, it is possible to prevent the cooling liquid to which the heat of the image forming unit FU (in particular the incident side polarization plates 452, the light modulation devices 453 and the emission side polarization plates 454) has been transferred, and which has risen in temperature from being retained around the image forming unit FU. Therefore, it is possible to more effectively cool the image forming unit (in particular the light modulation devices 453) as the cooling target compared to the case of cooling the image forming unit FU with a cooling blast, or the case of indirectly cooling the cooling target using a method of adopting a structure of disposing a pipe for making the cooling liquid flow in the vicinity of the cooling target.

Further, since the control device 6 is disposed outside the housing 51, it is possible to prevent the heat generated in the control device 6 from affecting the cooling liquid inside the housing 51.

Further, the housing 51 has the side surface part 513 functioning as a connection section for connecting the plurality of signal lines SL (the light modulation device side signal lines) extending from the respective light modulation devices 453 and the control device 6 to each other. According to this configuration, it is possible to make it easy to connect the control device 6 located outside the housing 51 and the plurality of light modulation devices 453 located inside the housing 51 to each other without leaking the cooling liquid encapsulated in the housing 51 to the outside of the housing 51.

The side surface part 513 has the three first connection sections 5131 to which the signal lines SL are respectively connected, and the second connection section 5132 which is electrically connected to these first connection sections 5131, and to which the signal line 61 (the control device side signal line) extending from the control device 6 is connected. According to this configuration, it is possible to reliably connect the plurality of light modulation devices 453 and the control device 6 located inside and outside the housing 51 to each other, and in addition, the connection described above can easily be achieved.

The flow speeds of the cooling liquid flowing along the incident side polarization plates 452 are substantially the same, the flow speeds of the cooling liquid flowing along the light modulation devices 453 are substantially the same, and the flow speeds of the cooling liquid flowing along the emission side polarization plates 454 are substantially the same. In other words, the flow speed of the cooling liquid is substantially the same in the three incident side polarization plates 452, and is substantially the same in the three light modulation devices 453, and is substantially the same in the three emission side polarization plates 454. According to this configuration, the incident side polarization plates 452 can be cooled at substantially the same cooling efficiency, the light modulation devices 453 can be cooled at substantially the same cooling efficiency, and the emission side polarization plates 454 can be cooled at substantially the same cooling efficiency. Therefore, the incident side polarization plates 452 corresponding respectively to the colored light beams can evenly be cooled, the light modulation devices 453 corresponding respectively to the colored light beams can evenly be cooled, and the emission side polarization plates 454 corresponding respectively to the colored light beams can evenly be cooled.

The cooling liquid encapsulated in the housing 51 is the fluorine-based inert fluid. According to this configuration, it is possible to make the light modulation devices 453 as electronic components operate in the state of being dipped in the cooling liquid. Therefore, it is possible to operate the light modulation devices 453 while cooling the light modulation devices 453, and thus, it is possible to stably operate the projector 1.

First Modified Example of First Embodiment

In the cooling device 5A described above, the impellers 522 of the stirring devices 52 are respectively disposed on the corner sections (the four corners) of the housing 51 viewed from the +Y direction side. However, this is not a limitation, and the arrangement of the stirring devices 52 can arbitrarily be modified providing the cooling liquid can be stirred inside the housing 51 to flow along the image forming unit FU, and at the same time the cooling liquid can be circulated inside the housing 51.

It should be noted that in the description below, a part which is the same or substantially the same as the part having already been described is denoted by the same reference symbol, and the description thereof will be omitted.

Figure 4:
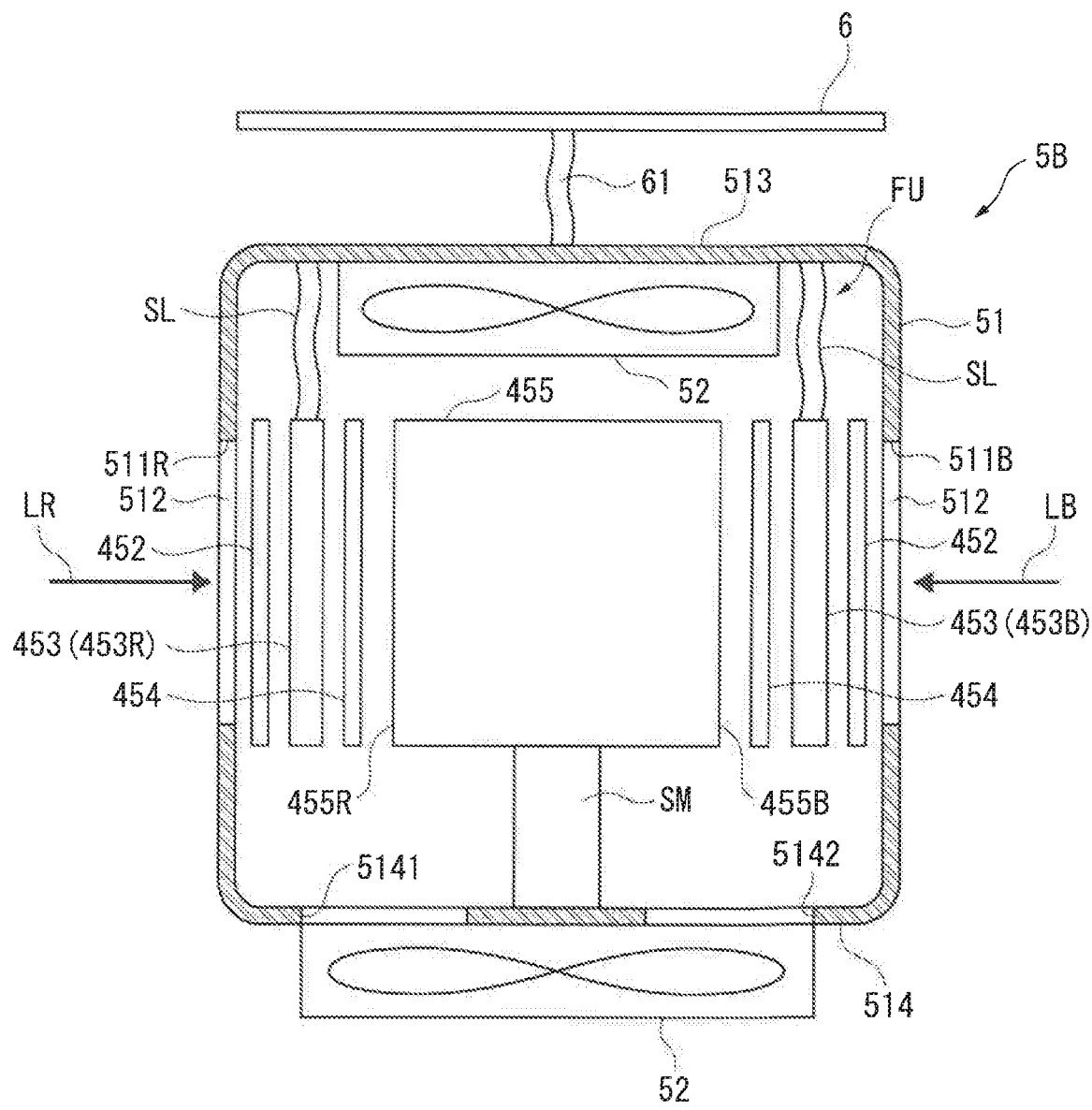
FIG. 4 is a schematic diagram showing a modification of the cooling device in the first embodiment mentioned above.

FIG. 4 is a schematic diagram showing a cooling device 5B which is a modification of the cooling device 5A. Specifically, FIG. 4 is a diagram schematically showing a cross-section of the cooling device 5B along the +X-Y plane.

For example, the cooling device 5B shown in FIG. 4 has the housing 51 in which the image forming unit FU described above is dipped in the cooling liquid encapsulated inside, and two stirring devices 52.

The two stirring devices 52 are disposed respectively on the +Y direction side and the -Y direction side with respect to the image forming unit FU.

In the detailed description, one of the stirring devices 52 is disposed on the +Y direction side with respect to the image forming unit FU inside the housing 51. The motor in the stirring device 52 is disposed outside the housing 51 although not shown in the drawing.

Further, the other of the stirring devices 52 is disposed on the -Y direction side with respect to the image forming unit FU, and outside the housing 51. The cooling liquid which inflows via one of two opening sections 5141, 5142 provided to the side surface part 514 located on the -Y direction side in the housing 51 is fed by this stirring device 52 to the inside of the housing 51 via the other of the opening sections 5141, 5142. It should be noted that the opening sections 5141, 5142 can also be connected to each other to form a single opening section, and can also be formed of a single ring-like opening section having a circular shape or a rectangular shape in the case of, for example, viewing the housing 51 from the +Y direction. Further, for example, it is also possible for the opening sections 5141, 5142 to be formed to have concentric shapes having the centers substantially coinciding with each other. In other words, the sizes, the shapes and the arrangement of the opening sections 5141, 5142 can arbitrarily be changed.

Even in the case in which these stirring devices 52 operate, the cooling liquid flows between the inner surfaces of the housing 51, the incident side polarization plates 452, the light modulation devices 453, the emission side polarization plate 454 and the light combining device 455 along these constituents in the process in which the cooling liquid circulates inside the housing 51 similarly to the case in the cooling device 5A described above. Thus, the image forming unit FU is cooled.

Even in the projector having such a cooling device 5B instead of the cooling device 5A, substantially the same advantages as those of the projector 1 described above can be exerted.

Second Modified Example of First Embodiment

In the cooling devices 5A, 5B described above, the opening sections 511B, 511G, 511P, and 511E of the housing 51 are closed with the light transmissive members 512 respectively fitted in these opening sections. However, this is not a limitation, the opening sections 511B, 511G, 511R, and 511E can also be closed with other light transmissive members such as wave plates as long as the light transmitted through these opening sections can be transmitted.

Figure 5:
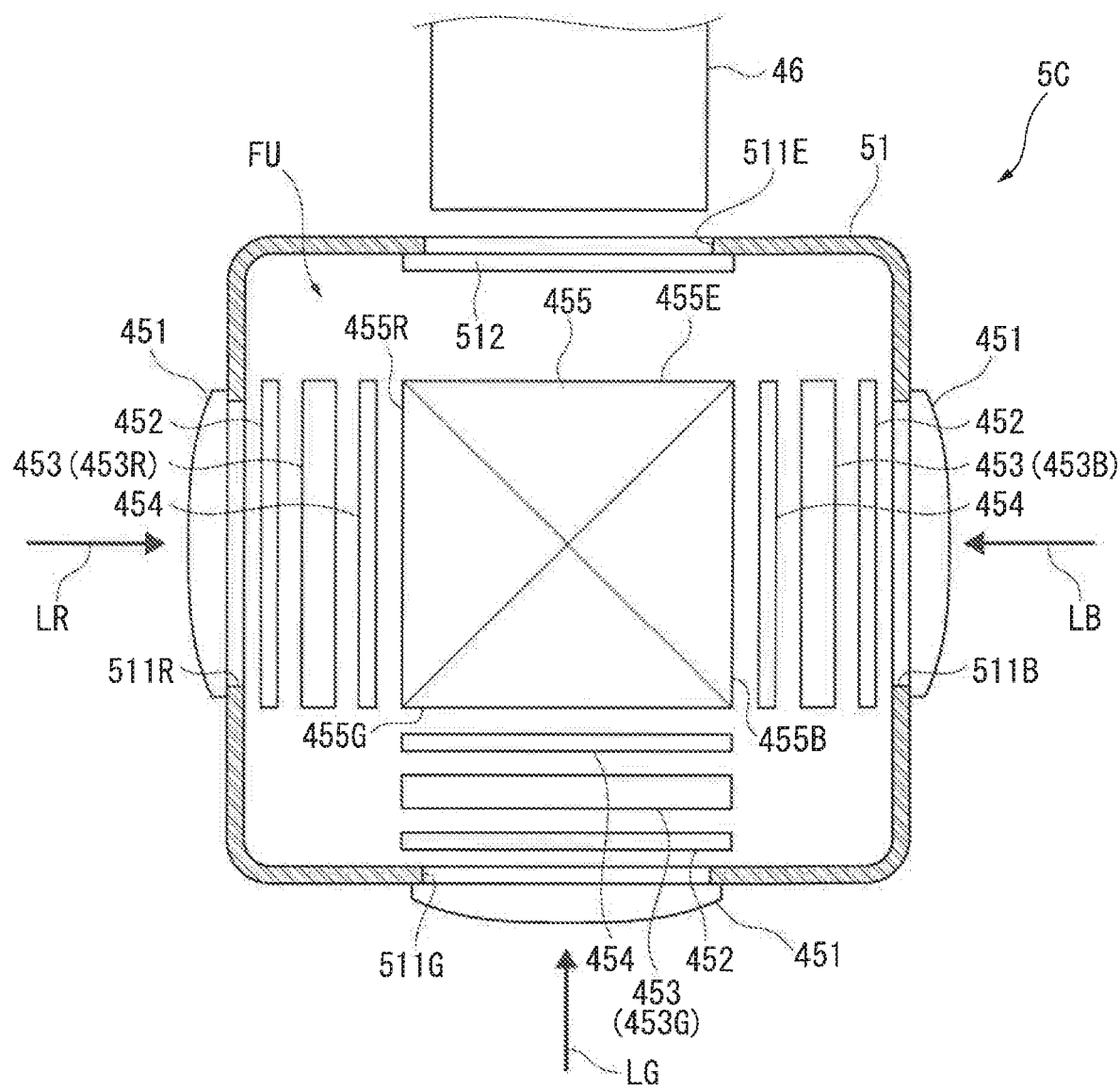
FIG. 5 is a schematic diagram showing a modification of the cooling device in the first embodiment mentioned above.
Figure 6:
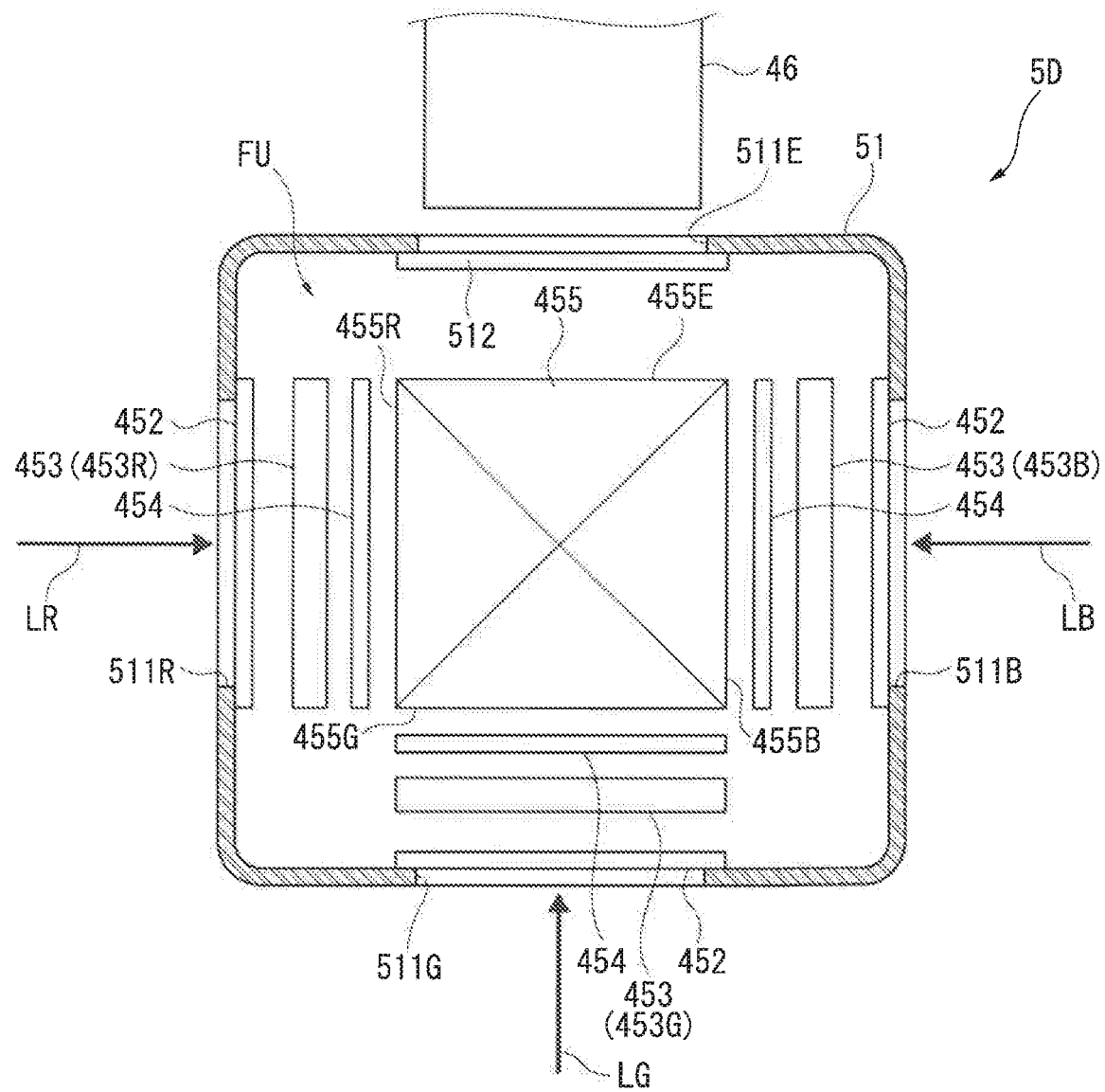
FIG. 6 is a schematic diagram showing a modification of the cooling device in the first embodiment mentioned above.

FIG. 5 and FIG. 6 are schematic diagrams respectively showing cooling devices 5C, 5D which are modifications of the cooling device 5A.

For example, the cooling devices 5C, 5D respectively shown in FIG. 5 and FIG. 6 each have the housing 51 and the stirring devices 52 (the stirring devices 52 are not shown) similarly to the cooling device 5A described above.

Among these devices, in the cooling device 5C, as shown in FIG. 5, the opening sections 511B, 511G, and 511R are each closed with the field lens 451 from the outside of the housing 51. It should be noted that the field lenses 451 can be located inside the housing 51 or can also be fitted in the respective opening sections 511B, 511G, and 511R providing the field lenses 451 are disposed at positions where the field lenses 451 close the respective opening sections 511B, 511G, and 511R. Further, the opening section 511E is closed from the inside of the housing 51 with the light transmissive member 512. However, the opening section 511E can also be closed with the light transmissive member 512 disposed outside the housing 51, or can also be closed with the light transmissive member 512 fitted in the opening section 511E.

In the cooling device 5D, as shown in FIG. 6, the opening sections 511B, 511G, and 511R are each closed with the incident side polarization plate 452 from the inside of the housing 51. It should be noted that the incident side polarization plates 452 can be located outside the housing 51 or can also be fitted in the respective opening sections 511B, 511G, and 511R providing the incident side polarization plates 452 are disposed at positions where the incident aide polarization plates 452 close the respective opening sections 511B, 511G, and 511R. Further, the opening section 511E is closed with the light transmissive member 512 from the inside of the housing 51 similarly to the cooling device 5C, but the position of the light transmissive member 512 for closing the opening section 511E is not particularly limited.

Even in the projector having such cooling devices 5C, 5D instead of the cooling device 5A, substantially the same advantages as those of the projector 1 described above can be exerted.

Second Embodiment

Then, a second embodiment of the invention will be described.

A projector according to the present embodiment has substantially the same configuration as that of the projector 1 described above, but the cooling liquid in the housing flows so that the flow direction of the cooling liquid on the light incidence side with respect to the light modulation device and the flow direction of the cooling liquid on the light emission side with respect to the light modulation device become opposite to each other. In this point, the projector according to the present embodiment and the projector 1 described above are different from each other. It should be noted that in the description below, a part which is the same or substantially the same as the part having already been described is denoted by the same reference symbol, and the description thereof will be omitted.

Figure 7:
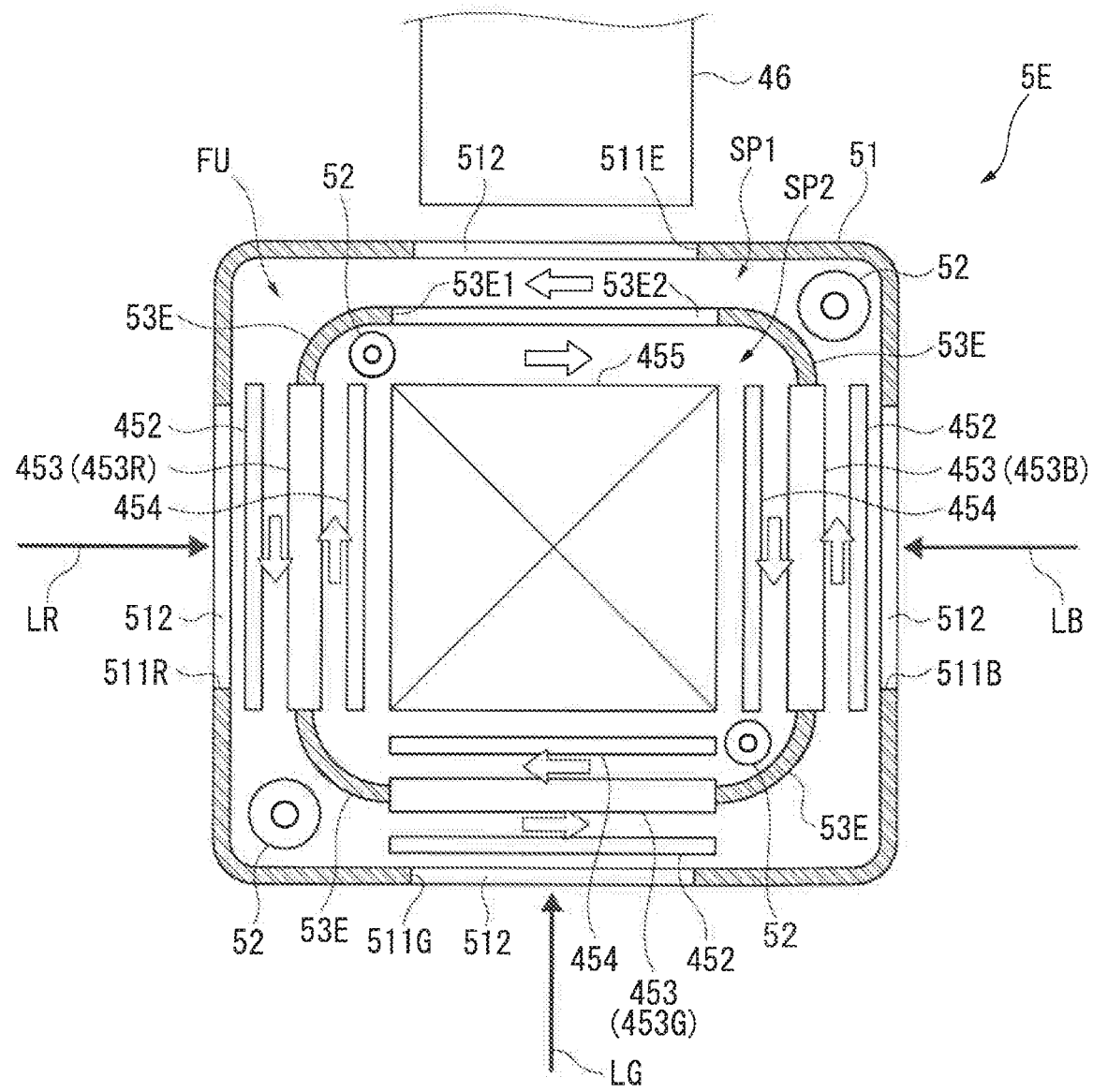
FIG. 7 is a schematic diagram showing a configuration of a cooling device provided to a projector according to a second embodiment of the invention.

FIG. 7 is a schematic diagram showing a cooling device 5E provided to the projector according to the present embodiment. In the detailed description, FIG. 7 is a diagram schematically showing a cross-section of the cooling device 5E along the X-Z plane.

The projector according to the present embodiment has substantially the same configuration and functions as those of the projector 1 described above except the point that the cooling device 5E is provided instead of the cooling device 5A.

As shown in FIG. 7, the cooling device 5E has a partition member 53E in addition to the housing 51 in which the cooling liquid described above is encapsulated, and the stirring devices 52.

The partition member 53E is disposed inside the housing 51, and partitions the space inside the housing 51. Specifically, the partition member 53E connects the light modulation devices 453 of the image forming unit FU disposed inside the housing 51 to each other in the +X direction and the +Z direction to partition the space into a space SP1 on the light incidence side with respect to the light modulation devices 453 and a space SP2 on the light emission side. Further, the partition member 53E partitions the area on the light emission surface 455E side of the light combining device 455 into the space SP1 and the space SP2. Due to such a partition member 53E, the emission side polarization plates 454 and the light combining device 455 are surrounded on the +Z direction side, the −Z direction side, the +X direction side and the −X direction side.

Such a partition member 53E has an opening section 53E1 through which the image light passes at a region opposed to the light emission surface 455E of the light combining device 455. The opening section 53E1 is closed with a light transmissive member 53E2 through which the image light can be transmitted.

It should be noted that although not shown in the drawings, inside the housing 51, there are formed spaces where the cooling liquid can flow on the +Y direction side and the −Y direction side with respect to the partition member 53E. Therefore, the cooling liquid is allowed to flow between the space SP1 and the space SP2. In the inside of each of these spaces SP1, SP2, there are disposed the stirring devices 52 (the shafts 521 and the impellers 522) to stir and circulate the cooling liquid inside the spaces SP1, SP2.

In such a cooling device 5E, when the stirring devices 52 inside the space SP1 are driven, the cooling liquid inside the space SP1 flows counterclockwise in the view of FIG. 7 (in the case of viewing the housing 51 from the +Y direction side so that the opening section 511E is located on the upper side). The cooling liquid flowing in such a manner flows between the inner surfaces of the housing 51 and the incident side polarization plates 452 and between the incident side polarization plates 452 and the light modulation devices 453 to cool the incident side polarization plates 452 and the light modulation devices 453. It should be noted that by the cooling liquid provided with the heat having contact with the inner surfaces of the housing 51, some of the heat of the cooling liquid is transferred to the housing 51, and is radiated outside by the housing 51. Thus, the cooling liquid is cooled.

Further, when the stirring devices 52 inside the space SP2 are driven, the cooling liquid inside the space SP2 flows clockwise in the view of FIG. 7. The cooling liquid flowing in such a manner flows between the light modulation devices 453 and the emission side polarization plates 454 and between the emission side polarization plates 454 and the light combining device 455 to cool the light modulation devices 453 and the emission side polarization plates 454.

Incidentally, in the case in which the flow direction of the cooling liquid is made the same between the light incidence side and the light emission side of each of the light modulation devices 453, the region on the upstream side in the flow direction in the light modulation device 453 along which the cooling liquid lower in temperature flows is cooled stronger than the region on the downstream side in the flow direction in the light modulation device 453 to cause a bias in temperature in the whole of the light modulation device 453 in some cases.

In contrast, in the present embodiment, the cooling liquid inside the housing 51 flows on the light incidence side and the light emission side of each of the light modulation devices 453 along the light modulation device 453 in the respective directions opposite to each other. In other words, the flow direction of the cooling liquid flowing on the light incidence side of each of the light modulation devices 453 and the flow direction of the cooling liquid flowing on the light emission side of each of the light modulation devices 453 are opposite to each other in each of the light modulation devices 453. Therefore, in the case of viewing each of the light modulation devices 453 along the proceeding direction of the incident light, the region located on the upstream side in the flow channel of the cooling liquid is reversed between the light incidence side and the light emission side with respect to that light modulation device 453. Thus, it is possible to substantially evenly cool each of the light modulation devices 453 as a whole, and thus, it is possible to effectively cool that light modulation device 453.

It should be noted that in the present embodiment, the flow speed of the cooling liquid flowing in the space SP1 and the flow speed of the cooling liquid flowing in the space SP2 are made substantially equal to each other. However, this is not a limitation, it is also possible to adopt a configuration in which, for example, the flow speed of the cooling liquid flowing in the space SP2 is made higher than the flow speed of the cooling liquid flowing in the space SP1 to thereby cool the emission side polarization plate 454 in a positive manner.

Advantages of Second Embodiment

According to the projector related to the present embodiment described hereinabove, in addition to the advantages substantially the same as those of the projector 1 described above, the following advantages can be obtained.

The cooling liquid flows on the light incidence side and the light emission side of each of the light modulation devices 453, and the flow direction of the cooling liquid flowing on the light incidence side of each of the light modulation devices 453 and the flow direction of the cooling liquid flowing on the light emission side are opposite to each other. According to this configuration, the upstream side in the flow channel of the cooling liquid flowing on the light incidence side with respect to one of the light modulation devices 453 and the upstream side in the flow channel of the cooling liquid flowing on the light emission side with respect to that light modulation device 453 are opposite to each other in the case of viewing that light modulation device 453 along the proceeding direction of the incident light. In other words, in one of the light modulation devices 453, the region along which the cooling liquid lower in temperature flows is located on the side reversed between the light incidence side and the light emission side. Therefore, it is possible for the cooling liquid to substantially evenly cool that light modulation device 453. Therefore, since each of the light modulation devices 453 can evenly be cooled, it is possible to effectively cool these light modulation devices 453.

Modifications of Second Embodiment

In the cooling device 5E described above, it is assumed that the cooling liquid in the space SP1 as the space located outside the partition member 53E disposed inside the housing 51 flows counterclockwise in the view of FIG. 7, and the cooling liquid in the space SP2 as the space located inside the partition member 53E flows clockwise in the view of FIG. 7. However, this is not a limitation, and the flow direction of the cooling liquid flowing inside the space SP1 can also be clockwise, and the flow direction of the cooling liquid flowing inside the space SP2 can also be counterclockwise. Further, it is also possible for the cooling liquid to flow in these spaces SP1, SP2 in the same direction.

Further, it is also possible to make the cooling liquid flow so that the cooling liquid having flowed inside the space SP1 to cool the surfaces on the light incidence side of the light modulation devices 453R, 453G, and 453B in sequence inflows in the space SP2, and the cooling liquid having flowed inside the space SP2 to cool the surfaces on the light emission side of the light modulation devices 453B, 453G, and 453R inflows in the space SP1. Further, the flow direction of the cooling liquid can also be reversed. In other words, it is also possible for the stirring devices 52 and the partition member 53E to make the cooling liquid alternately flow in the spaces SP1, SP2.

Figure 8:
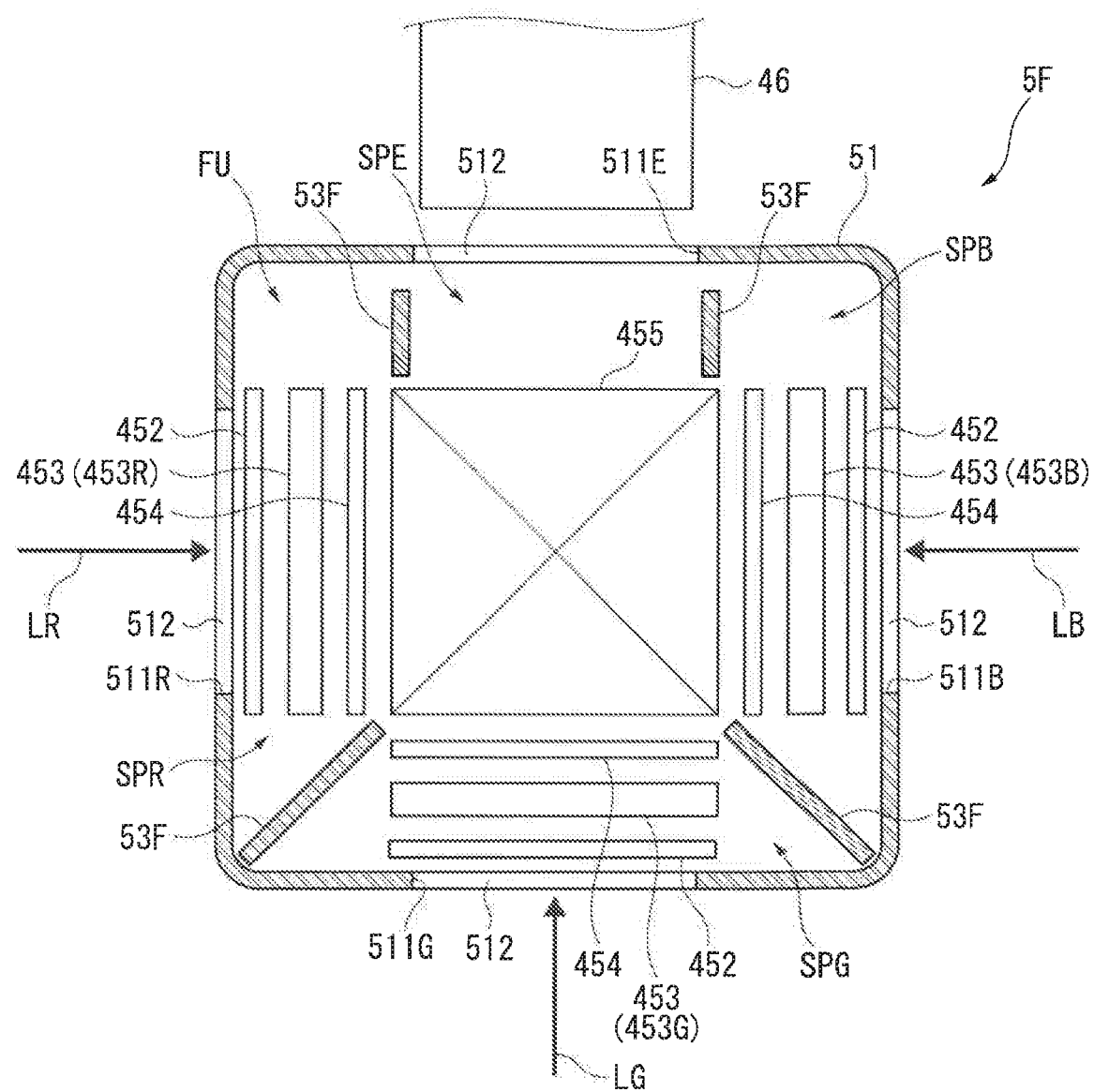
FIG. 8 is a schematic diagram showing a modification of the cooling device in the second embodiment mentioned above.
Figure 9:
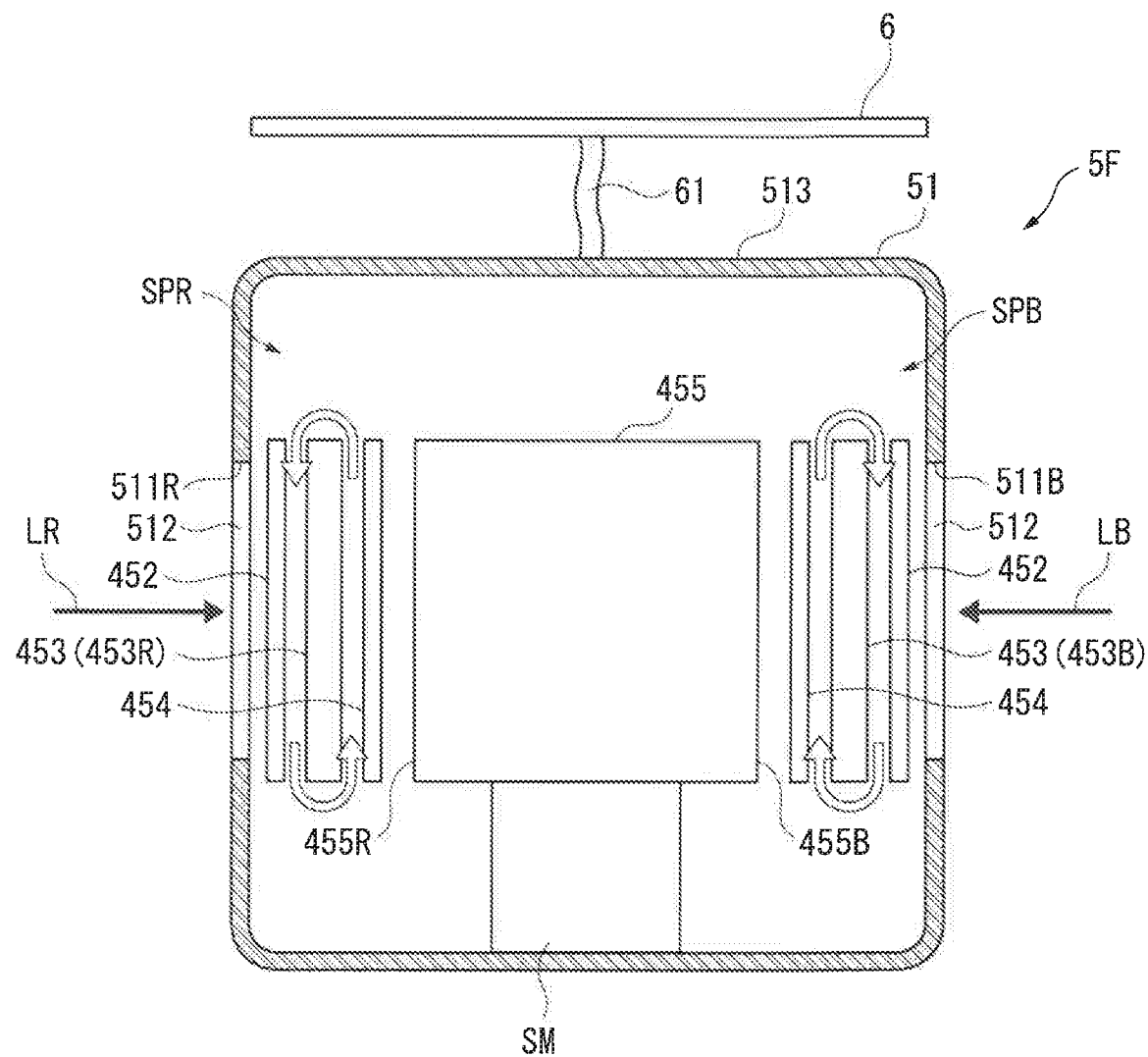
FIG. 9 is a schematic diagram showing a modification of the cooling device in the second embodiment mentioned above.

FIG. 8 and FIG. 9 are schematic diagrams showing a cooling device 5E which is a modification of the cooling device 5E. In the detailed description, FIG. 8 is a diagram schematically showing a cross-section of the cooling device 5F along the X-Z plane, and FIG. 9 is a diagram schematically showing a cross-section of the cooling device 5F along the X-Y plane. It should be noted that the illustration of the signal lines SL is omitted in FIG. 9.

Further, as in the cooling device 5F shown in FIG. 8 and FIG. 9, it is also possible to make the cooling liquid flow so that the flow direction of the cooling liquid flowing on the light incidence side with respect to the light modulation device 453 and the flow direction of the cooling liquid flowing on the light emission side are opposite to each other in the +Y direction.

Specifically, the cooling device 5F has the housing 51, the stirring devices 52 (not shown in FIG. 8 and FIG. 9), and a partition member 53F.

Among these constituents, the partition member 53F partitions the space in the housing 51 into three spaces SPB, SPG, and SPR located on the light incidence side with respect to the light combining device 455 and a space SPE located on the light emission side with respect to the light combining device 455 so as to allow the cooling liquid to flow as shown in FIG. 8. In other words, the spaces SPB, SPG, SPR, and SPE are sectioned by the partition member 53F so that the cooling liquid can flow along the spaces one another.

Among these spaces, the space SPB is a space where the incident side polarization plate 452, the light modulation device 453B and the emission side polarization plate 454 through which the blue light LB passes are located, the space SPG is a space where the incident side polarization plate 452, the light modulation device 453G and the emission side polarization plate 454 through which the green light LG passes are located, and the space SPR is a space where the incident side polarization plate 452, the light modulation device 453R and the emission side polarization plate 454 through which the red light LR passes are located.

Although not shown in the drawings, in each of these spaces SPB, SPG, and SPR, there is disposed at least one stirring device 52.

Further, as shown in FIG. 9, when driving the stirring device 52, the cooling liquid in the space SPB flows on the light incidence side of the light modulation device 453B toward the −Y direction along the light modulation device 453B, and also flows on the light emission side toward the +Y direction along the light modulation device 453B. Further, the cooling liquid in the space SPR flows on the light incidence side of the light modulation device 453R toward the −Y direction along the light modulation device 453R, and also flows on the light emission side toward the +Y direction along the light modulation device 453R. Further, although not shown in the drawings, the cooling liquid in the space SPG flows on the light incidence side of the light modulation device 453G toward the −Y direction along the light modulation device 453G, and also flows on the light emission side toward the +Y direction along the light modulation device 453G.

It should be noted that in the configuration of the cooling device 5F, it is also possible for the cooling liquid to flow on the light incidence side of the light modulation devices 453 in the +Y direction and flow on the light emission side in the −Y direction. Further, it is also possible for the flow direction of the cooling liquid flowing on the light incidence side to be different between the light modulation devices 453, and it is also possible for the flow direction of the cooling liquid flowing on the light emission side to be different between the light modulation devices 453.

According also to the projector equipped with such a cooling device 5F, the same advantages as in the projector equipped with the cooling device 5E described above can be exerted.

Third Embodiment

Then, a third embodiment of the invention will be described.

A projector according to the present embodiment has substantially the same configuration as that of the projector 1 described above, but the cooling device has a flow channel for making the cooling liquid flow outside the housing 51 to cool the cooling liquid. In this point, the projector according to the present embodiment and the projector 1 described above are different from each other. It should be noted that in the description below, a part which is the same or substantially the same as the part having already been described is denoted by the same reference symbol, and the description thereof will be omitted.

Figure 10:
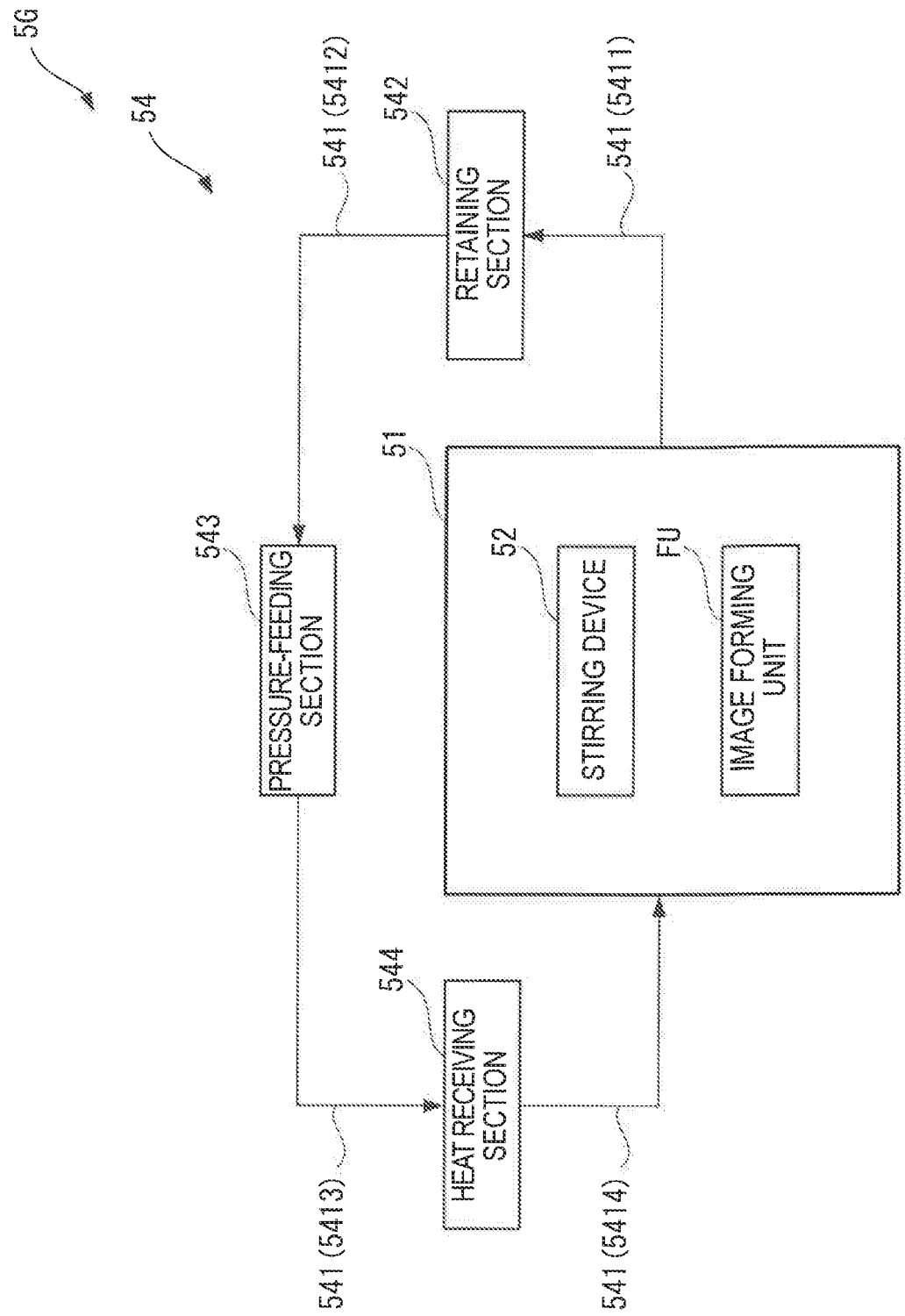
FIG. 10 is a schematic diagram showing a configuration of a cooling device provided to a projector according to a third embodiment of the invention.

FIG. 10 is a block diagram showing an overall configuration of a cooling device 5G provided to the projector according to the present embodiment.

The projector according to the present embodiment has substantially the same configuration and functions as those of the projector 1 described above except the point that the cooling device 5G is provided instead of the cooling device 5A.

The cooling device 5G has an external cooling mechanism 54 for cooling the cooling liquid in the housing 51 in the outside of the housing 51 as shown in FIG. 10 in addition to having the housing 51 in which the cooling liquid described above is encapsulated and the stirring devices 52 similarly to the cooling device 5A described above.

The external cooling mechanism 54 has a plurality of pipes 541 (5411 through 5414), a retaining section 542, a pressure-feeding section 543 and a heat receiving section 544. The plurality of pipes 541, the retaining section 542, the pressure-feeding section 543 and the heat receiving section 544 respectively correspond to a first pipe, a first retaining section, a first pressure-feeding section and a first heat receiving section.

The plurality of pipes 541 (5411 through 5414) along which the cooling liquid flows connects the housing 51, the retaining section 542, the pressure-feeding section 543 and the heat receiving section 544 to each other so that the cooling liquid can flow along these constituents. Specifically, the pipe 5411 connects the housing 51 and the retaining section 542 to each other, and the pipe 5412 connects the retaining section 542 and the pressure-feeding section 543 to each other. Further, the pipe 5413 connects the pressure-feeding section 543 and the heat receiving section 544 to each other, and the pipe 5414 connects the heat receiving section 544 and the housing 51 to each other.

The retaining section 542 is a so-called tank, disposed outside the housing 51, and temporarily retains the cooling liquid inflowing from the housing 51 via the pipe 5411 in the inside thereof. The retaining section 542 also has a function of retaining a bubble in the case in which the bubble is mixed in the cooling liquid.

The pressure-feeding section 543 is a so-called pump, disposed outside the housing 51, and pressure-feeds the cooling liquid retained in the retaining section 542 to the heat receiving section 544 via the pipe 5413. In other words, the cooling liquid inflowing from the retaining section 542 via the pipe 5412 is pressure-fed by the pressure-feeding section 543 toward the housing 51.

The heat receiving section 544 is a so-called heat exchanger (a radiator), disposed outside the housing 51, receives the heat of the cooling liquid inflowing via the pipe 5413, and radiates the heat to the outside to thereby cool the cooling liquid. The cooling liquid having been cooled by such a heat receiving section 544 is made to flow into the housing 51 via the pipe 5414. It should be noted that it is also possible to provide a cooling fan for cooling the heat receiving section 544.

Here, although the detailed illustration will be omitted, for example, one end of the pipe 5414 is connected to the neat receiving section 544, and the other end of the pipe 5414 is connected to a side surface part on the −Y direction side in the housing 51. Further, one end of the pipe 5411 is connected to the retaining section 542, and the other end of the pipe 5411 is connected to the side surface part (the side surface part 513) on the +Y direction side in the housing 51. Therefore, the cooling liquid having been cooled by the heat receiving section 544 is supplied from a lower surface of the housing 51, and is then discharged to the external cooling mechanism 54 from the upper surface of the housing 51. Therefore, it is possible to fill the housing 51 with the cooling liquid, and it is possible to dip the image forming unit FU in the cooling liquid.

In such a cooling device 5G, when the pressure-feeding section 543 is driven, the cooling liquid having flowed from the housing 51 into the retaining section 542, and then having been retained is supplied to the heat receiving section 544. The cooling liquid having been cooled by the heat receiving section 544 is supplied to the housing 51. Thus, the cooling liquid low in temperature is supplied to the inside of the housing 51, and the cooling liquid is made to flow by the stirring device 52 along each of the constituents of the image forming unit FU to cool the image forming unit FU.

As described above, since it is possible to cool the image forming unit FU with the cooling liquid having been cooled by the heat receiving section 544, it is possible to more effectively cool the image forming unit FU.

It should be noted that in the external cooling mechanism 54 along which the cooling liquid flows in the outside of the housing 51 through the pipes 541 from the housing 51, the order in which the cooling liquid flows through the retaining section 542, the pressure-feeding section 543 and the heat receiving section 544 can arbitrarily be changed. In other words, the arrangement of the retaining section 542, the pressure-feeding section 543 and the heat receiving section 544 in the flow channel of the cooling liquid can arbitrarily be changed. Further, the configuration in the housing 51 can be the same as any one of the configurations in the cooling devices 5A through 5F described above, and the flow direction of the cooling liquid can also be the same as or different from any one of the configurations in the cooling devices 5A through 5F. Further, the number and the arrangement of the stirring devices 52 in the housing 51 can arbitrarily be changed. Further, for example, the other end of the pipe 5414 one end of which is connected to the heat receiving section 544 can be connected to a region on the −Y direction side of any one of the side surface parts in the ±X directions and the ±Z directions of the housing 51, and the other end of the pipe 5411 one end of which is connected to the retaining section 542 can be connected to a region on the +Y direction side of any one of the side surface parts in the ±X directions and the ±Z directions of the housing 51. In this case, the other end described above of the pipe 5414 can be connected to the region on the −Y direction side of one of the side surface parts in the ±Y directions and the ±Z directions, and the other end described above of the pipe 5411 can be connected to the region on the +Y direction side of one of the side surface parts in the ±X directions and the ±Z directions other than the one of the side surface parts. Further, it is possible to connect the other end described above of the pipe 5411 to the same side surface part as the side surface part to which the other end described above of the pipe 5414 is connected, and to the region on the +Y direction side of the region to which the other end described above of the pipe 5414 is connected. Further, for example, in the case in which the −Y direction is parallel to the vertical direction, it is also possible for the pipe 5414 for making the cooling liquid inflow into the housing 51 to be connected to a region on the lower side in the vertical direction in the housing 51, and it is also possible for the pipe 5411 for making the cooling liquid outflow from the housing 51 to be connected to a region on the upper aide in the vertical direction in the housing 51.

Advantages of Third Embodiment

According to the projector related to the present embodiment described hereinabove, in addition to the advantages substantially the same as those of the projector 1 described above, the following advantages can be obtained.

The inside of the housing 51 is supplied with the cooling liquid having been retained in the retaining section 542 and then pressure-fed by the pressure-feeding section 543. According to this configuration, it is possible to prevent the cooling liquid from getting short in the housing 51. Therefore, it is possible to make it easy to fill the housing 51 with the cooling liquid.

Further, since the heat receiving section 544 receives the heat of the cooling liquid inflowing via the pipe 5413, it is possible for the external cooling mechanism 54 to supply the cooling liquid having been cooled by the heat receiving section 544 to the housing 51. Therefore, since it is possible to cool the cooling liquid in the outside of the housing 51, it is possible to more effectively cool the image forming unit FU to be cooled by the cooling liquid.

Fourth Embodiment

Then, a fourth embodiment of the invention will be described.

A projector according to the present embodiment is provided with substantially the same configuration as that of the projector 1 described above, but is different from the projector 1 in the point that the housing of the cooling device is different. It should be noted that in the description below, a part which is the same or substantially the same as the part having already been described is denoted by the same reference symbol, and the description thereof will be omitted.

Figure 11:
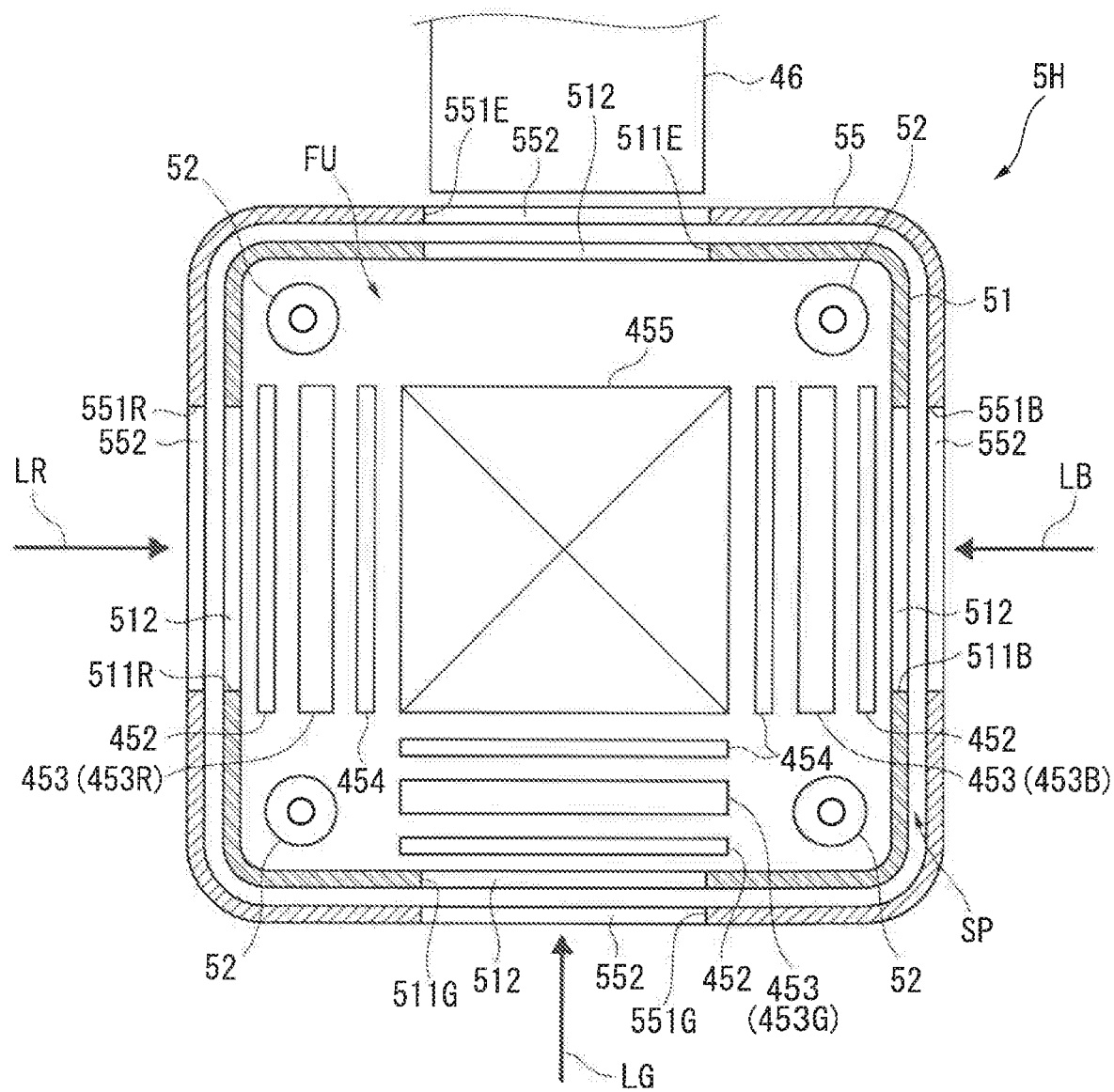
FIG. 11 is a schematic diagram showing a configuration of a cooling device provided to a projector according to a fourth embodiment of the invention.
Figure 12:
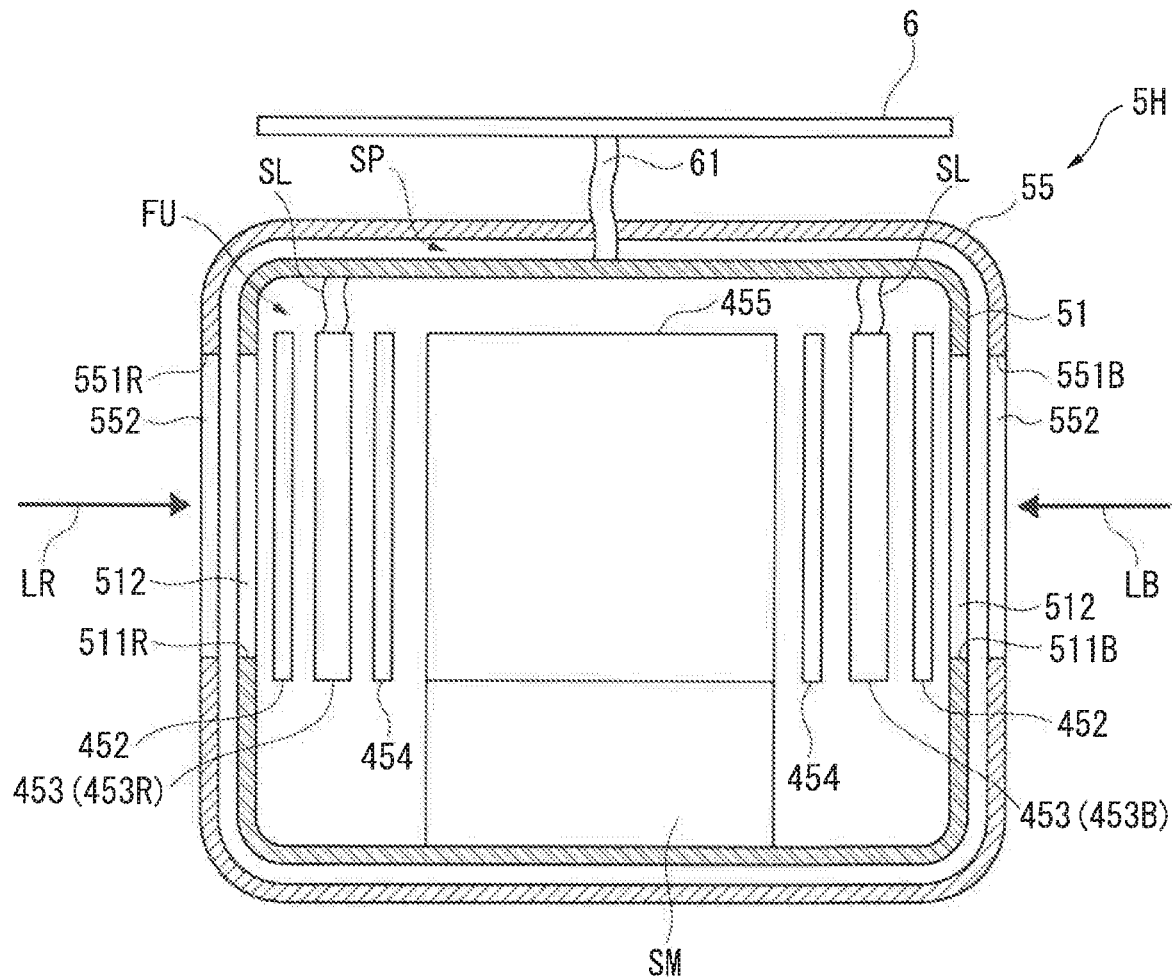
FIG. 12 is a schematic diagram showing the configuration of the cooling device in the fourth embodiment mentioned above.

FIG. 11 and FIG. 12 are each a schematic diagram showing a configuration of a cooling device 5H provided to the projector according to the present embodiment. In the detailed description, FIG. 11 is a diagram schematically showing a cross-section of the cooling device 5H along the X-Z plane, and FIG. 12 is a diagram schematically showing a cross-section of the cooling device 5H along the X-Y plane. It should be noted that the illustration of the stirring devices 52 is omitted in FIG. 12.

The projector according to the present embodiment has substantially the same configuration and functions as those of the projector 1 described above except the point that the cooling device 5H is provided instead of the cooling device 5A.

The cooling device 5H has an external housing 55 as shown in FIG. 11 and FIG. 12 in addition to having the housing 51 in which the cooling liquid described above is encapsulated and the stirring devices 52 similarly to the cooling device 5A.

As shown in FIG. 11 and FIG. 12, the external housing 55 is a housing surrounding the housing 51. The external housing 55 has opening sections 551B, 551G, and 551R which the colored light beams LB, LG, and LR respectively entering the opening sections 511B, 511G, and 511P of the housing 51 pass through, and an opening section 551E which the image light emitted through the opening section 511E of the housing 51 passes through. These opening sections 551B, 551G, 551R, and 551E are each closed by a light transmissive member 552. Therefore, the external housing 55 is a sealed housing surrounding the housing 51. It should be noted that similarly to the housing 51, the sealed housing as the external housing 55 also includes a simplified sealed structure as long as the cooling liquid located inside the external housing 55 is prevented from being leaked outside the external housing 55.

Inside such an external housing 55, there is formed a space SP surrounding the housing 51, and the space SP corresponds to a space between the housing 51 and the external housing 55. Further, the space SP is made as a space with positive pressure by a gas having contact with the outer surface of the housing 51 and encapsulated therein. The pressure of the space SP is higher than the pressure in the housing 51. Therefore, the cooling liquid located inside the housing 51 is prevented from being leaked outside the housing 51 (e.g., inside the external housing 55).

It should be noted that the cooling device 5H can also be provided with a configuration further provided with the external cooling mechanism 54 (the pipes 541, the retaining section 542, the pressure-feeding section 543 and the heat receiving section 544) described above. Further, also in the cooling device 5H, the configuration in the housing 51 can be the same as any one of the configurations in the cooling devices 5A through 5F described above, and the flow direction of the cooling liquid can also be the same as or different from any one of the configurations in the cooling devices 5A through 5F. Further, the number and the arrangement of the stirring devices 52 in the housing 51 can arbitrarily be changed.

Advantages of Fourth Embodiment

According to the projector related to the present embodiment described hereinabove, in addition to the advantages substantially the same as those of the projector 1 described above, the following advantages can be obtained.

The external housing 55 is a housing surrounding the housing 51, and by the gas having contact with the outer surface of the housing 51 being encapsulated in the external housing 55, the external housing 55 is provided with the space SP with the positive pressure surrounding the housing 51. According to this configuration, it is possible to prevent the cooling liquid from being leaked from the housing 51. Therefore, it is possible to keep the state in which the image forming unit FU is dipped in the cooling liquid.

Fifth Embodiment

Then, a fifth embodiment of the invention will be described.

A projector according to the present embodiment has substantially the same configuration as that of the projector according to the fourth embodiment described above, but the cooling device has a configuration of circulating to cool the cooling liquid encapsulated in an external housing in the outside of the external housing. In this point, the projector according to the present embodiment and the projector according to the fourth embodiment are different from each other. It should be noted that in the description below, a part which is the same or substantially the same as the part having already been described is denoted by the same reference symbol, and the description thereof will be omitted.

Figure 13:
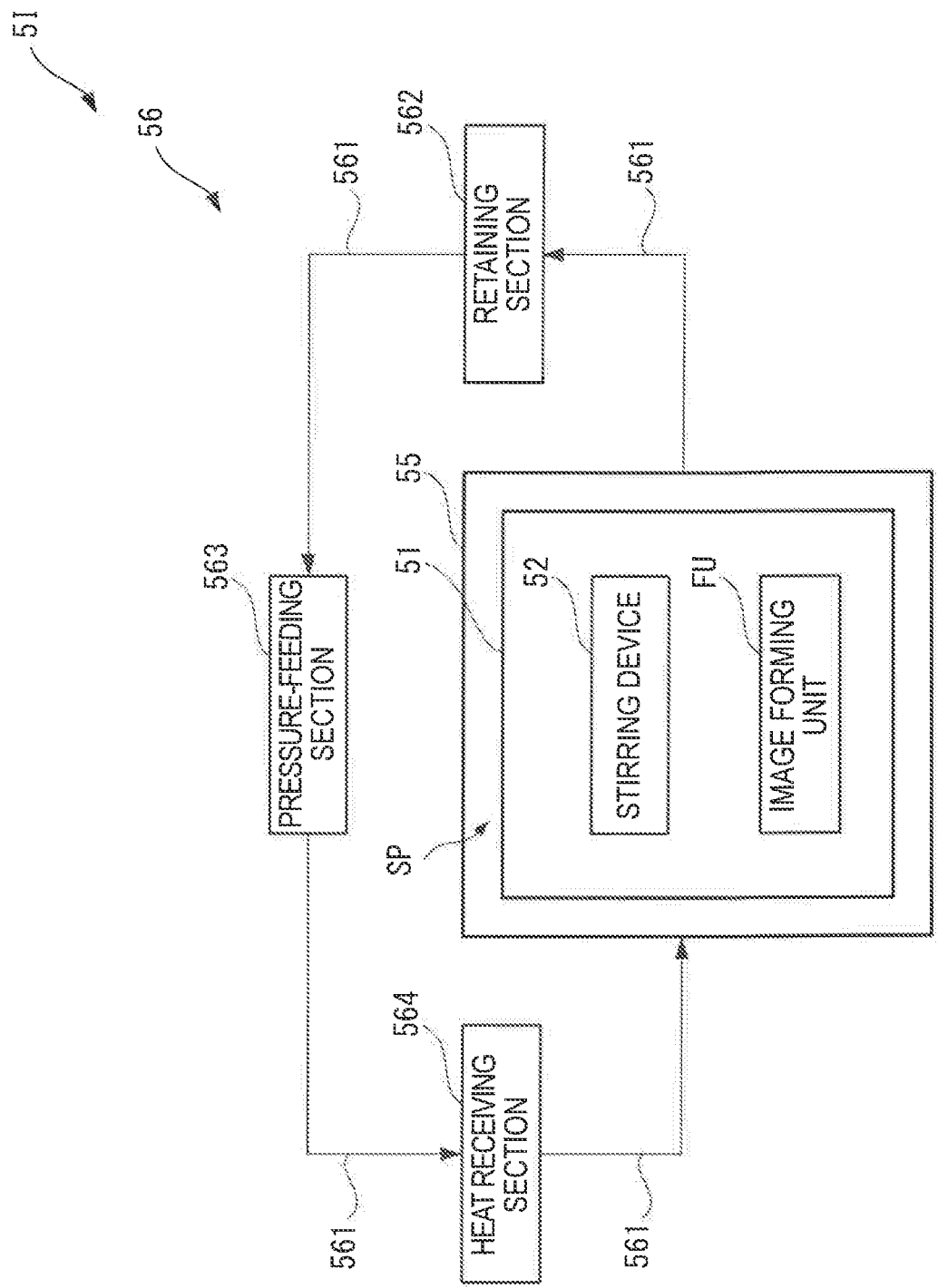
FIG. 13 is a schematic diagram showing a configuration of a cooling device provided to a projector according to a fifth embodiment of the invention.

FIG. 13 is a schematic diagram showing a configuration of a cooling device 5I provided to the projector according to the present embodiment.

The projector according to the present embodiment has substantially the same configuration and functions as those of the projector shown in the fourth embodiment described above except the point that the cooling device 5I is provided instead of the cooling device 5H.

As shown in FIG. 13, the cooling device 5I is provided with the housing 51 in which the cooling liquid described above is encapsulated and the stirring devices 52, and the external housing 55 surrounding the housing 51 similarly to the cooling device 5H described above. In the external housing 55, there is encapsulated the cooling liquid as a second cooling liquid in the present embodiment. In other words, the second cooling liquid is encapsulated in the space SP between the housing 51 and the external housing 55. The cooling liquid does not have direct contact with the light modulation devices 453, and is therefore not required to be an inert fluid, and it is possible to adopt a liquid refrigerant higher in heat transfer coefficient than the cooling liquid in the housing 51. As such a liquid refrigerant, there can be cited an antifreeze liquid such as a propylene glycol solution or an ethylene glycol solution. It should be noted that it is also possible to use water as the cooling liquid in the case in which there is no possibility of freezing.

The pressure in the external housing 55 is made higher than the pressure in the housing 51 similarly to the above, and the cooling liquid in the housing 51 is prevented from being leaked to the inside of the external housing 55.

Such a cooling device 5I has an external cooling mechanism 56 for cooling the cooling liquid encapsulated in the space SP of the external housing 55 in the outside of the external housing 55. The external cooling mechanism 56 is provided with a plurality of pipes 561, a retaining section 562, a pressure-feeding section 563 and a heat receiving section 564 similarly to the external cooling mechanism 54. The plurality of pipes 561 the retaining section 562, the pressure-feeding section 563 and the heat receiving section 564 have substantially the same configurations as those of the pipes 541, the retaining section 542, the pressure-feeding section 543 and the heat receiving section 544, respectively. Further, the plurality of pipes 561, the retaining section 562, the pressure-feeding section 563 and the heat receiving section 564 respectively correspond to a second pipe, a second retaining section, a second pressure-feeding section and a second heat receiving section.

One end of the pipe 561 the other end of which is connected to the heat receiving section 564, and one end of the pipe 562 the other end of which is connected to the retaining section 562 are connected to the external housing 55. Further, in the external cooling mechanism 56, when the pressure-feeding section 563 is driven, the cooling liquid located inside the external housing 55 inflows into the retaining section 562 via the pipe 561. The pressure-feeding section 563 pressure-feeds the cooling liquid temporarily retained in the retaining section 562 to the heat receiving section 564, and the cooling liquid having been cooled in the heat receiving section 564 is supplied to the external housing 55. Then, the cooling liquid having had contact with the outer surface of the housing 51 to absorb the heat from the housing 51 in the external housing 55 is retained once again by the retaining section 562.

It should be noted that the cooling device 5I can also be provided with the configuration further provided with the external cooling mechanism 54 described above. Further, also in the cooling device 5I, the configuration in the housing 51 can be the same as any one of the configurations in the cooling devices 5A through 5E described above, and the flow direction of the cooling liquid can also be the same as or different from any one of the configurations in the cooling devices 5A through 5F. Further, the number and the arrangement of the stirring devices 52 in the housing 51 can arbitrarily be changed. Further, the external cooling mechanism 56 can be eliminated.

Advantages of Fifth Embodiment

According to the projector related to the present embodiment described hereinabove, in addition to the advantages substantially the same as those of the projector according to the fourth embodiment described above, the following advantages can be obtained.

In the space SP between the housing 51 and the external housing 55, there is encapsulated the cooling liquid (the second cooling liquid). According to this configuration, since the housing 51 to which the heat of the cooling liquid located inside the housing 51 is transferred can be cooled by the cooling liquid located inside the external housing 55, it is possible to indirectly cool the cooling liquid for cooling the image forming unit FU. Therefore, it is possible to more effectively cool the image forming unit FU.

The cooling liquid encapsulated in the space SP of the external housing 55 has a higher heat transfer coefficient than that of the cooling liquid located inside the housing 51. According to this configuration, it is possible to make it easy to transfer the heat of the cooling liquid having direct contact with the image forming unit FU to the cooling liquid encapsulated in the space SP of the external housing 55 via the housing 51. Therefore, it is possible to make the temperature of the cooling liquid inside the housing 51 lower, and by extension, it is possible to more effectively cool the image forming unit FU.

The cooling device 5I has the external cooling mechanism 56, and the external cooling mechanism 56 is provided with the pipes 561, the retaining section 562, the pressure-feeding section 563 and the heat receiving section 564. According to this configuration, the cooling liquid encapsulated in the space SP of the external housing 55 can be cooled outside the external housing 55. Therefore, it is possible to make the temperature of the cooling liquid inside the housing 51 lower, and by extension, it is possible to effectively cool the image forming unit FU described above.

Sixth Embodiment

Then, a sixth embodiment of the invention will be described.

A projector according to the present embodiment is provided with substantially the same configuration as that of the projector 1 described above. However, in a cooling device provided to the projector according to the present embodiment, flow of the cooling liquid between the light combining device 455 and the projection optical device 46 is restricted. In this point, the projector according to the present embodiment and the projector 1 described above are different from each other. It should be noted that in the description below, a part which is the same or substantially the same as the part having already been described is denoted by the same reference symbol, and the description thereof will be omitted.

Figure 14:
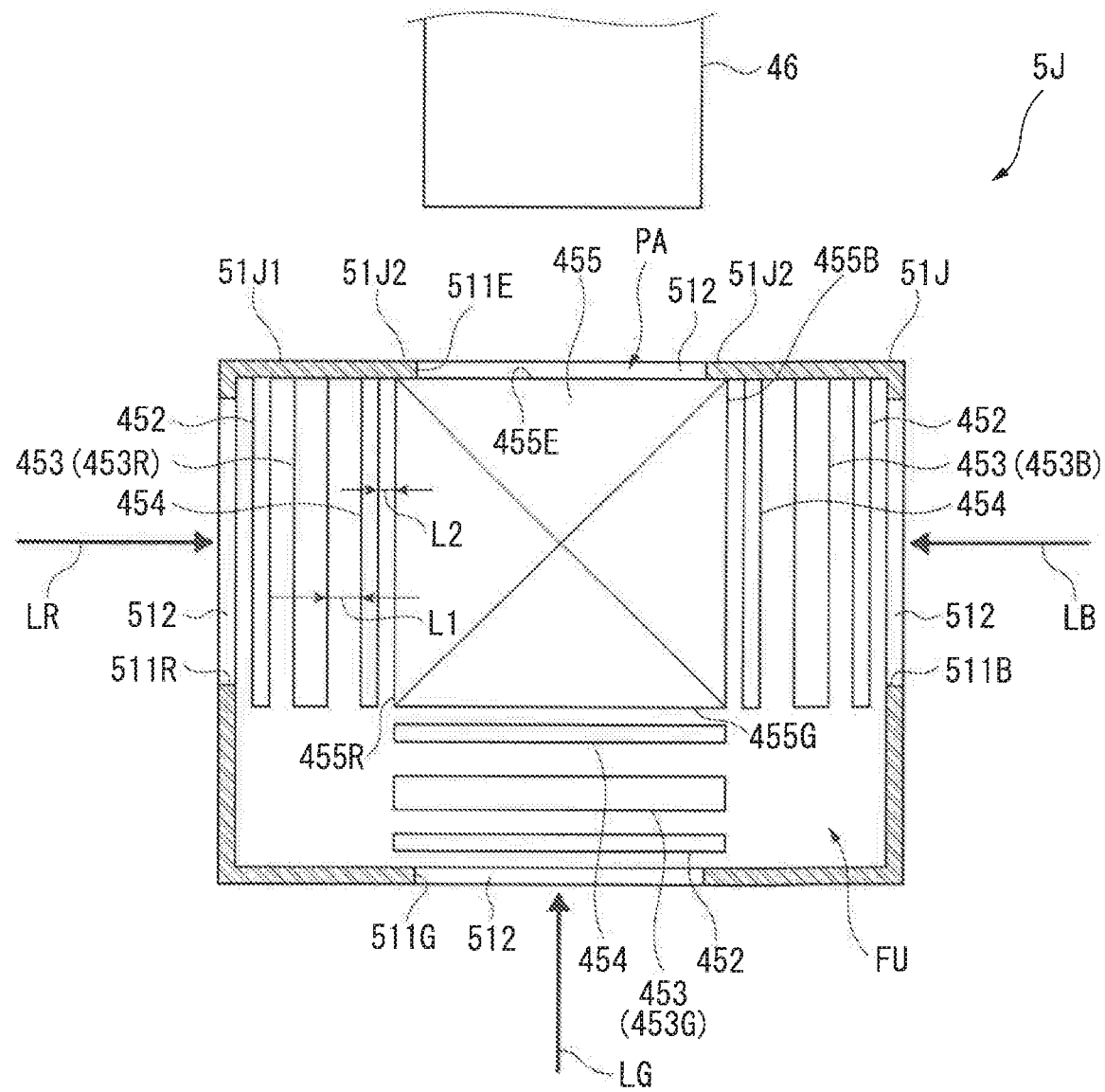
FIG. 14 is a schematic diagram showing a configuration of a cooling device provided to a projector according to a sixth embodiment of the invention.

FIG. 14 is a schematic diagram showing a cooling device 5J provided to the projector according to the present embodiment. In the detailed description, FIG. 14 is a diagram schematically showing a cross-section of the cooling device 5J along the X-Z plane.

The projector according to the present embodiment has substantially the same configuration and functions as those of the projector 1 described above except the point that the cooling device 5J is provided instead of the cooling device 5A.

As shown in FIG. 14, the cooling device 5J is provided with a housing 51J and the stirring devices 52 (not shown in FIG. 14).

The housing 51J is a sealed housing in which the cooling liquid as an inert fluid is encapsulated in addition to having the image forming unit FU disposed inside similarly to the housing 51. The housing 51J is provided with the opening sections 511B, 511G, 511P, and 511E each closed by the light transmissive member 512 in addition to the first connection sections 5131 and the second connection section 5132 although not shown in the drawings.

In addition, the housing 51J has a restriction section 51J2 in a side surface part 51J1 located on the +Z direction side, therein the restriction section 51J2 is connected to an outside part of a light beam passage area PA in the light emission surface 455E of the light combining device 455. Further, the housing 51J has a flow channel (a first flow channel) in which the cooling liquid flows between the light modulation devices 453 and the emission side polarization plates 454 corresponding respectively to the light modulation devices 453 along the light modulation devices 453 and the emission side polarization plates 454, and a flow channel (a second flow channel) in which the cooling liquid flows between the emission side polarization plates 454 and planes of incidence of light 455B, 455G, and 455R of the light combining device 455 corresponding respectively to the emission side polarization plates 454 along the emission side polarization plates 454 and the light combining device 455.

The restriction section 51J2 is connected to the light emission surface 455E of the light combining device 455 outside the light beam passage area PA, and is disposed in a position where the restriction 5132 does not block the light beam. The restriction section 51J2 is a region for restricting the inflow of the cooling liquid to the light beam passage area PA (in detail, the area on the +Z direction side from the light beam passage area PA), and prevents the cooling liquid from flowing between the light emission surface 455E and the projection optical device 46 in the light path of the image light entering the projection optical device 46 from the light emission surface 455E. In other words, the restriction section 51J2 prevents the cooling liquid from flowing between the light combining device 455 and the projection optical device 46. In the present embodiment, such a restriction section 51J2 is configured by an end edge forming the opening section 511E being connected to the light emission surface 455E.

Here, the cooling liquid changes in density with the temperature, and varies in refractive index in accordance with the change in the density. For example, in the case of the inert fluid described above, the refractive index decreases as the temperature rises, and the refractive index increases as the temperature drops. In the case in which the cooling liquid as such an inert fluid flows in the housing 51J1 to cool the cooling target, an uneven temperature distribution occurs in the cooling liquid, and by extension, an uneven refractive index distribution occurs in some cases.

Further, if the uneven refractive index distribution occurs in the cooling liquid in the configuration in which the cooling liquid flows from each of the light modulation devices 453 to the region in the posterior stage of the light path, the back focus position of the projection optical device 46 changes. In other words, the back focus position becomes locally misaligned with each of the light modulation devices 453. If such a local variation of the back focus position occurs, a phenomenon that the central position of a certain pixel changes, and a phenomenon that the size of that pixel changes (hereinafter these phenomena are referred to as a resolution unevenness) are observed in the image projected by the projection optical device 46.

The more the region where the uneven refractive index distribution described above occurs is distant from the light modulation device 453 in the posterior stage (on the light emission side from the light modulation device 453) of the light path of the light emitted from the light modulation device 453, the more conspicuously the resolution unevenness appears. In other words, the closer to the projection optical device 46 the region becomes, the more conspicuously the resolution unevenness appears. For example, in the case of providing a configuration in which the cooling liquid can flow between the light modulation devices 453 and the emission side polarization plates 454 corresponding to each other, between the emission side polarization plates 454 and the planes of incidence of light 455B, 455G, and 455R of the light combining device 455 corresponding to each other, and between the light emission surface 455E of the light combining device 455 and the projection optical device 46, if the uneven refractive index distribution described above occurs in the cooling liquid flowing between the light combining device 455 and the projection optical device 46, the resolution unevenness described above appears the most conspicuously.

In contrast, in the cooling device 5J described above, in the light paths of the light emitted from the light modulation devices 453 and then entering the projection optical device 46, it is restricted by the restriction section 51J2 described above that the cooling liquid flows in an inter-optical component area the most distant from the light modulation devices 453, namely the area between the light emission surface 455E and the projection optical device 46. Therefore, the cooling liquid does not flow in the area between the light emission surface 455E and the projection optical device 46.

According to this configuration, it is possible to suppress the occurrence of the resolution unevenness described above compared to the case in which there is adopted a configuration that the cooling liquid can flow between the light combining device 455 and the projection optical device 46.

Further, in the configuration of the cooling device 5J in which the cooling liquid flows in a direction crossing the proceeding direction of the light, the occurrence state of such a resolution unevenness changes in accordance with the size of the flow channel width (the dimension along the proceeding direction of the light in the flow channel of the cooling liquid; liquid thickness) of the cooling liquid in the posterior stage of the light path of each of the light modulation devices 453. For example, if the flow channel width increases, the resolution unevenness described above becomes conspicuous, and if the flow channel width decreases, it becomes difficult to observe the resolution unevenness described above.

In contrast, in the cooling device 5J, the light modulation devices 453, the emission side polarization plates 454 and the light combining device 455 are arranged so that the dimensions between the emission side polarization plates 454 and the light combining device 455 along the light paths of the colored light beams emitted from the light modulation devices 453 become smaller than the dimensions between the light modulation devices 453 and the emission side polarization plates 454. For example, in the light path of the red light LR, the dimension L2 between the emission side polarization plate 454 and the plane of incidence of light 455R is smaller than the dimension L1 between the light modulation device 453R and the emission side polarization plate 454. In other words, the flow channel width of the cooling liquid flowing between the emission side polarization plate 454 and the plane of incidence of light 455R is smaller than the flow channel width of the cooling liquid flowing between the light modulation device 453R and the emission side polarization plate 454. Thus, it is possible to cool the light modulation device 453 and the emission side polarization plate 454 while suppressing the occurrence of the resolution unevenness described above.

It should be noted that as described above, the cooling device 53 can also be provided with the external cooling mechanism 54. Further, the cooling device 5J can also be provided with the external housing 55 described above surrounding the housing 51J, and in the case in which another cooling liquid is encapsulated in the external housing 55, the cooling device 5J can also be provided with the external cooling mechanism 56. In the case in which the external housing 55 encapsulating the other cooling liquid is provided to the housing 51J, it is sufficient to dispose another restriction section for restricting the inflow of the other cooling liquid on the light path of the image light emitted from the housing 51J and entering the projection optical device 46 in the external housing 55. Further, the flow direction of the cooling liquid inside the housing 51J can also be the same as or different from the flow direction of the cooling liquid described above. In addition, the number and the arrangement of the stirring devices 52 in the housing 51J can arbitrarily be changed.

Further, in the present embodiment, it is sufficient for the optical component illustrated as the emission side polarization plate 454 to be disposed between at least one light modulation device (a target light modulation device) 453 out of the plurality of light modulation devices 453R, 453G, and 453B and the light combining device 455. Further, it is sufficient for the dimension L2 between the optical component and the light combining device 455 to be made smaller than the dimension L1 between the at least one light modulation device 453 described above and the optical component.

Advantages of Sixth Embodiment

According to the projector related to the present embodiment described hereinabove, in addition to the advantages substantially the same as those of the projector 1 described above, the following advantages can be obtained.

The housing 51J has the restriction section 51J2 for restricting the inflow of the cooling liquid between the light combining device 455 (the light emission surface 455E) and the projection optical device 46. According to this configuration, even in the case in which the uneven refractive index distribution described above occurs in the cooling liquid, it is possible to prevent the resolution unevenness described above from being observed. Therefore, the deterioration of the image projected can be suppressed.

Between the light modulation device 453 and the light combining device 455, there is disposed the emission side polarization plate 454 as an optical component which the light emitted from the light modulation device 453 (the target light modulation device) enters. Further, in the case in which the flow channel of the cooling liquid flowing between the light modulation device 453 and the emission side polarization plate 454 along the light modulation device 453 and the emission side polarization plate 454 is defined as a first flow channel, and the flow channel of the cooling liquid flowing between the emission side polarization plate 454 and the light combining device 455 along the emission side polarization plate 454 and the light combining device 455 is defined as a second flow channel, the dimension L2 (the flow channel width of the second flow channel) of the second flow channel along the light path of the light emitted from the light modulation device 453 is smaller than the dimension L1 (the flow channel width of the first flow channel) of the first flow channel along the light path of the light emitted from the light modulation device 453. According to this configuration, it is possible to prevent the resolution unevenness from being observed compared to the case in which the dimension L1 of the first flow channel described above is larger than the dimension L2 of the second flow channel described above.

Besides the above, in the case in which the flow speeds of the cooling liquid in the first flow channel and the second flow channel described above are the same, the flow rate of the cooling liquid flowing through the first flow channel (the flow channel between the light modulation device 453 and the emission side polarization plate 454) becomes higher than the flow rate of the cooling liquid flowing through the second flow channel (the flow channel between the emission side polarization plate 454 and the light combining device 455). In such a case, it is possible to make it easy to cool the light modulation device 453.

Seventh Embodiment

Then, a seventh embodiment of the invention will be described.

A projector according to the present embodiment is provided with substantially the same configuration as that of the projector 1 described above, but is different from the projector 1 in the point that the flow direction of the cooling liquid flowing along the light modulation device 453 is different. It should be noted that in the description below, a part which is the same or substantially the same as the part having already been described is denoted by the same reference symbol, and the description thereof will be omitted.

Figure 15:
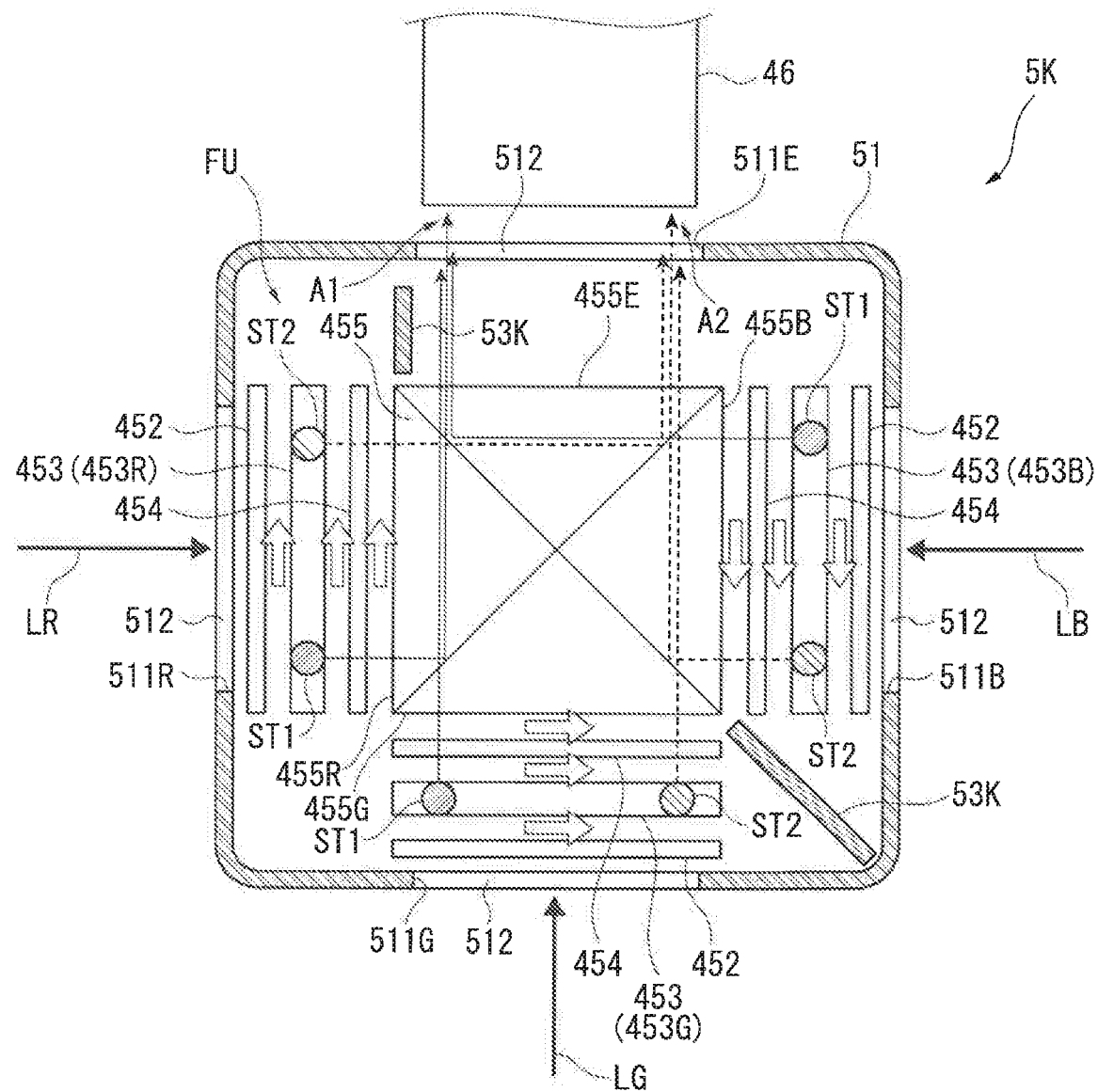
FIG. 15 is a schematic diagram showing a configuration of a cooling device provided to a projector according to a seventh embodiment of the invention.

FIG. 15 is a schematic diagram showing a configuration of a cooling device 5K provided to the projector according to the present embodiment. In the detailed description, FIG. 15 is a diagram schematically showing a cross-section of the cooling device 5K along the X-Z plane, and is a diagram showing the flow direction of the cooling liquid in the cooling device 5K, and the light paths of the colored light beams passing through the respective light modulation devices 453 and then entering the projection optical device 46 via the light combining device 455.

The projector according to the present embodiment has substantially the same configuration and functions as those of the projector 1 described above except the point that the cooling device 5K is provided instead of the cooling device 5A.

As shown in FIG. 15, the cooling device 5K has a plurality of partition members 53K in addition to the housing 51 in which the cooling liquid described above is encapsulated, and the stirring devices 52 (not shown in FIG. 15).

The plurality of partition members 53K partitions the space in the housing 51 to control the flow direction of the cooling liquid flowing due to stirring by the stirring devices 52. Specifically, the plurality of partition members 53K makes the cooling liquid flow from a region ST1 (a one-end side region for modulating light corresponding to light in a one-end side area in the image light in the light modulation device 453) corresponding to an area A1 on the one-end side in the image light combined by the light combining device 455 and then entering the projection optical device 46 toward a region ST2 (a the-other-end side region for modulating light corresponding to light in a the-other-end side area in the image light in the light modulation device 453) corresponding to an area A2 on the the-other-end side in the image light in each of the light modulation devices 453. Specifically, in each of the light modulation devices 453, a region of the light modulation device 453 for modulating the light corresponding to the area A1 on the one-end side (the +X direction side) of a light beam in a direction perpendicular to the proceeding direction of the light beam entering the projection optical device 46 from the light combining device 455 is defined as a one-end side region (the region ST1), a region of the light modulation device 453 for modulating the light corresponding to the area A2 on the the-other-end side (the −X direction side) of the light beam is defined as a the-other-end side region (the region ST2). Further, the cooling liquid flows from the region ST1 toward the region ST2.

Here, in the image forming unit FU in which the light modulation devices 453B, 453G, and 453P are disposed so as to be opposed respectively to the three planes of incidence of light 455B, 455G, and 455R adjacent to each other in the light combining device 455 having a rectangular solid shape, the green light LG proceeds along the +Z direction to pass through the incident side polarization plate 452, the light modulation device 453G and the emission side polarization plate 454, and then passes through the light combining device 455 to enter the projection optical device 46. Meanwhile, the blue light LB proceeds along the +X direction to pass through the incident side polarization plate 452, the light modulation device 453B and the emission side polarization plate 454, and is then reflected by the light combining device 455 toward the +Z direction to enter the projection optical device 46. Meanwhile, the red light LR proceeds along the −X direction to pass through the incident side polarization plate 452, the light modulation device 453R and the emission side polarization plate 454, and is then reflected by the light combining device 455 toward the +Z direction to enter the projection optical device 46.

Therefore, in the light modulation device 453G disposed along the X-Y plane and located on the −Z direction side with respect to the light combining device 455, the region ST1 corresponding to the area A1 (the area on the one-end side) on the +X direction side in the image light entering the projection optical device 46 is the region on the +X direction side. Further, in the light modulation device 453G, the region ST2 corresponding to the area A2 (the area on the the-other-end side) on the −X direction side in the image light is the region on the −X direction side.

Similarly, in the light modulation device 453B disposed along the Y-Z plane and located on the −X direction side with respect to the light combining device 455, the region ST1 corresponding to the area A1 described above is the region on the +Z direction side, and the region ST2 corresponding to the area A2 described above is the region on the −Z direction side. Further, in the light modulation device 453R disposed along the Y-Z plane and located on the +X direction side with respect to the light combining device 455, the region ST1 corresponding to the area A1 described above is the region on the −Z direction side, and the region ST2 corresponding to the area A2 described above is the region on the +Z direction side.

Incidentally, as described above, the cooling liquid varies in refractive index with the temperature. Further, in the cooling device 5K, the cooling liquid flows from one-end side in the light modulation device 453 toward the-other-end side, and therefore, on the-other-end side, the temperature of the cooling liquid is apt to be high, and the refractive index is apt to be low. As described above, since it is difficult for the refractive index distribution of the cooling liquid to be even in accordance with the temperature distribution of the cooling liquid, the illuminance unevenness becomes apt to be caused by the cooling liquid flowing on the light incidence side with respect to the light modulation device 453, and further, the resolution unevenness described above becomes apt to be caused by the cooling liquid flowing on the light emission side with respect to the light modulation device 453.

Further, color shading is observed in the image displayed by projecting the image light unless the light beams having passed through the areas low in refractive index of the cooling liquid in the respective light modulation devices 453 are located on the same side in the image light entering the projection optical device 46, and further, the light beams having passed through the areas high in refractive index of the cooling liquid in the respective light modulation devices 453 are located on the same side in the image light. In other words, in the case in which in the colored light beams modulated by the respective light modulation devices 453, the light beams having passed through the area low in refractive index of the cooling liquid fail to form the same region in the image light, or the light beams having passed through the area high in refractive index fail to form the same region in the image light, the color shading is observed in the image displayed.

In contrast, the plurality of partition members 53K described above controls the flow of the cooling liquid so that the cooling liquid flowing along each of the light modulation devices 453B, 453G, and 453R flows from the region ST1 of each of the light modulation device 453 toward the region 3T2. In other words, the flow direction of the cooling liquid flowing along the surface on the light incidence side in each of the light modulation devices 453 is substantially the same among the light modulation devices 453 in the direction of connecting the one-end side region (the region ST1) described above and the the-other-end side region (the region ST2) described above to each other. Further, the flow direction of the cooling liquid flowing along the surface on the light emission side in each of the light modulation devices 453 is substantially the same among the light modulation devices 453 in the direction of connecting the one-end side region (the region ST1) described above and the the-other-end side region (the region ST2) described above to each other. Further, the flow speeds of the cooling liquid flowing on the light incidence side and the light emission side of each of the light modulation devices 453B, 453G, and 453R are the same.

Specifically, the cooling liquid flowing on the light incidence side and the light emission side of the light modulation device 453G along the light modulation device 453G flows in the −X direction from the region ST1 toward the region ST2. Further, the cooling liquid flowing on the light incidence side and the light emission side of the light modulation device 453B along the light modulation device 453B flows in the −Z direction from the region ST1 toward the region ST2. Further, the cooling liquid flowing on the light incidence side and the light emission side of the light modulation device 453R along the light modulation device 453R flows in the +Z direction from the region ST1 toward the region ST2.

By the cooling liquid flowing in such a manner, the influences of the refractive index of the cooling liquid on the respective regions ST1 corresponding to the area A1 described above can be made to substantially coincide with each other in the respective light modulation devices 453, and the influences of the refractive index of the cooling liquid on the respective regions ST2 corresponding to the area A2 described above can be made to substantially coincide with each other in the respective light modulation devices 453. In other words, the influences of the refractive index distribution of the cooling liquid on the light beams passing through the respective light modulation devices 453 can be made to substantially coincide with each other in the light modulation devices 453. Thus, it is possible to prevent the color shading and the resolution unevenness from appearing in the entire image displayed.

Advantages of Seventh Embodiment

According to the projector related to the present embodiment described hereinabove, in addition to the advantages substantially the same as those of the projector 1 described above, the following advantages can be obtained.

The cooling liquid flows along the surface on the light incidence side of each of the light modulation devices 453. On this occasion, the cooling liquid flows from the region ST1 toward the region ST2. In other words, the flow direction of the cooling liquid flowing on the light incidence side in each of the light modulation devices 453 is substantially the same among the light modulation devices 453 in the direction of connecting the region ST1 and the region ST2 to each other. According to this configuration, the modulated light beams modulated by the respective light modulation devices 453 enter the projection optical device 46 as the modulated light beams having the same illuminance distribution. Therefore, it is possible to prevent the image different in illuminance distribution between the colors from being projected, and thus, it is possible to prevent the illuminance unevenness described above from being observed.

The cooling liquid flows along the surface on the light emission side of each of the light modulation devices 453. On this occasion, the cooling liquid is made to flow from the region ST1 toward the region ST2. In other words, the flow direction of the cooling liquid flowing on the light emission side in each of the light modulation devices 453 is substantially the same among the light modulation devices 453 in the direction of connecting the region ST1 and the region ST2 to each other. According to this configuration, the modulated light beams having been modulated by the respective light modulation devices 453 and then passing through the cooling liquid turn to the modulated light beams having the same resolution unevenness distribution, and then enter the projection optical device 46. Therefore, it is possible to prevent the image different in resolution unevenness distribution between the colors from being projected, and thus, it is possible to prevent the resolution unevenness described above from being observed.

Modifications of Seventh Embodiment

In the cooling device 5K described above, it is assumed that the cooling liquid flowing on the light incidence side and the light emission side of the light modulation device 453 flows from the region ST1 in each of the light modulation devices 453 toward the region ST2. However, the flow direction of the cooling liquid is not limited to the above providing the flow direction is along the direction of connecting the region ST1 and the region ST2 to each other, and coincides between the light modulation devices 453. For example, it is also possible for the cooling liquid to flow on the light incidence side and the light emission side of each of the light modulation devices 453 from the region ST2 toward the region ST1.

Further, it is also possible for the cooling liquid to flow on the light incidence side and the light emission side of each of the light modulation devices 453 toward the −Y direction or the +Y direction. In this case, one of the area A1 on the one-end side in the image light and the area A2 on the the-other-end side is an area on the +Y direction side in the image light, and the other thereof becomes the area on the −Y direction side. Even in this case, the region ST1 in each of the light modulation devices 453 is a region for modulating the light (the light forming the area A1) corresponding to the light in the area A1, and the region ST2 is a region for modulating the light (the light forming the area A2) corresponding to the light in the area A2.

Even in these cases, the direction from the region of the light modulation device 453 for modulating the light corresponding to the light in the area on the one-end side in the image light toward the region of the light modulation device 453 for modulating the light corresponding to the light in the area on the the-other-end side and the flow direction of the cooling liquid can be made to coincide with each other in each of the light modulation devices 453.

Figure 16:
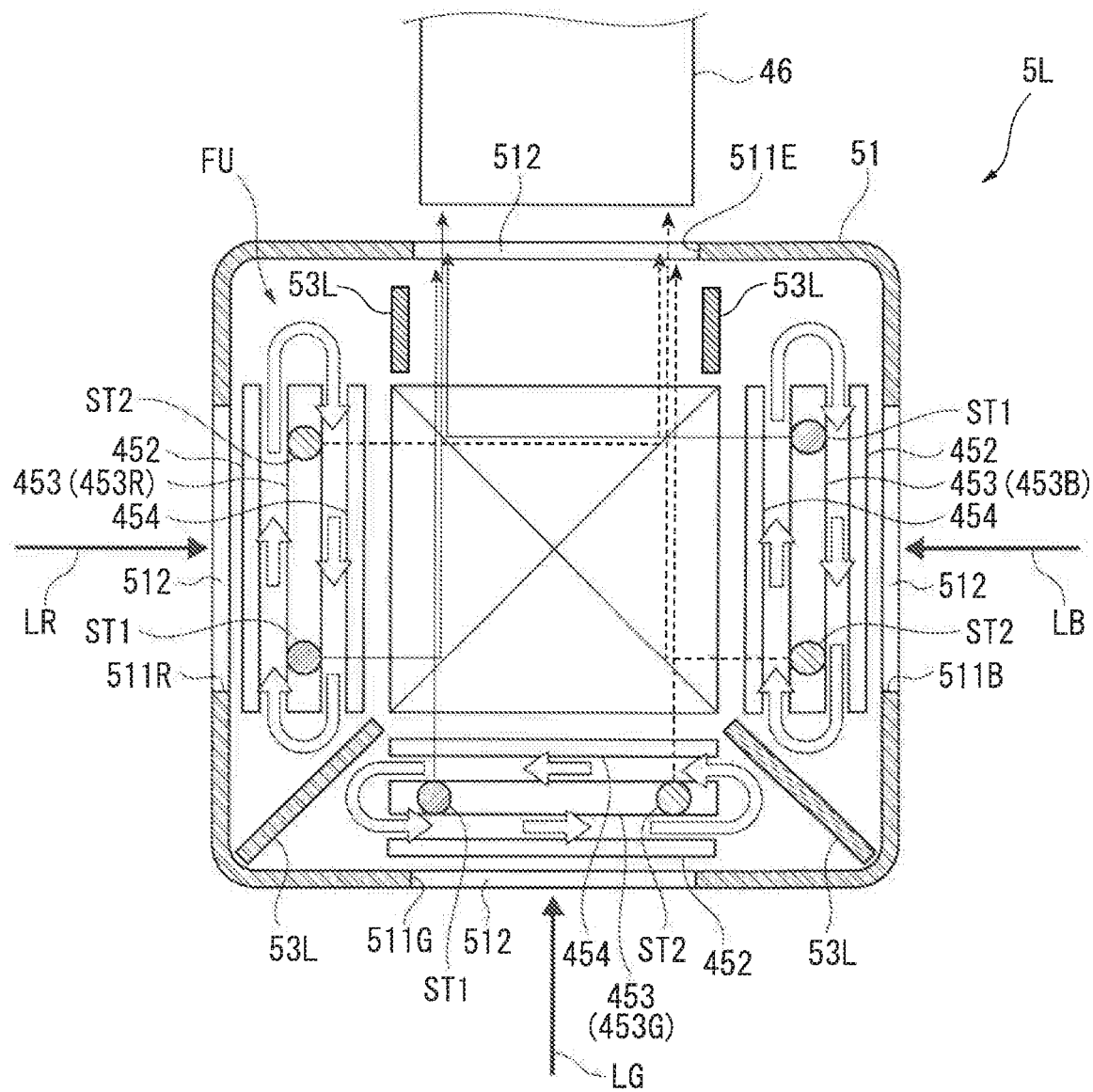
FIG. 16 is a schematic diagram showing a modification of the cooling device in the seventh embodiment mentioned above.

FIG. 16 is a schematic diagram showing a cooling device 5L which is a modification of the cooling device 5K. In the detailed description, FIG. 16 is a diagram schematically showing a cross-section of the cooling device 5L along the X-Z plane, and is a diagram showing the flow direction of the cooling liquid in the cooling device 5L, and the light paths of the colored light beams passing through the respective light modulation devices 453 and then entering the projection optical device 46 via the light combining device 455.

Further, as the cooling device 5L shown in FIG. 16, it is also possible to adopt a configuration in which the flow direction of the cooling liquid flowing on the light incidence side of each of the light modulation devices 453 and the flow direction of the cooling liquid flowing on the light emission side of that light modulation device 453 are opposite to each other due to the stirring devices 52 (not shown in FIG. 16) and the plurality of partition members 53L.

In the detailed description, the cooling device 5L has the housing 51 in which the image forming unit FU is disposed, the stirring devices 52 (not shown in FIG. 16), the cooling liquid encapsulated inside the housing 51, and the plurality of partition members 53L disposed inside the housing 51.

Among these constituents, the plurality of partition members 53L partitions the space inside the housing 51 similarly to the partition members 53K described above. The partition members 53L makes the cooling liquid flow from the region ST1 toward the region ST2 on the light incidence side of each of the light modulation devices 453, and makes the cooling liquid flow from the region ST2 toward the region ST1 on the light emission side of each of the light modulation devices 453.

For example, the plurality of partition members 53L makes the cooling liquid flow along the surface on the light incidence side of the light modulation device 453G from the region ST1 toward the region ST2, and then guides the cooling liquid to the light emission side of the light modulation device 453G to flow along the surface on the light emission aide from the region ST2 toward the region ST1. Then, the plurality of partition members 53L guides the cooling liquid to the light incidence side of the light modulation device 453G to flow along the surface on the light incidence side once again from the region ST1 toward the region ST2. The plurality of partition members 53L makes the cooling liquid flowing along the other light modulation devices 453B, 453R flow in a similar manner.

As described above, by flowing the cooling liquid, although the flow direction of the cooling liquid is reversed between the light incidence side and the light emission side of each of the light modulation devices 453, it is possible to make the direction from the region ST1 toward the region ST2 and the flow direction of the cooling liquid coincide with each other on the light incidence side of each of the light modulation devices 453, and it is possible to make the direction from the region ST2 toward the region ST1 and the flow direction of the cooling liquid coincide with each other on the light emission side of each of the light modulation devices 453. Therefore, it is possible to prevent the color shading and the resolution unevenness from being observed in the image displayed.

Further, since the cooling liquid flows so as to circulate on the light incidence side and the light emission side of the light modulation device 453, it is possible to more substantially evenly cool the light modulation device 453 as shown in the cooling devices 5E, 5F compared to the case in which the cooling liquid flows on the light incidence side and the light emission side in the same direction.

It should be noted that in the cooling device 5L described above, it is also possible for the cooling liquid to flow from the region ST2 toward the region ST1 on the light incidence side of the light modulation device 453, and flow from the region ST1 toward the region ST2 on the light emission side. Further, the cooling device 5L is not limited to the configuration in which the cooling liquid having flowed on the light incidence side directly flows on the light emission side, but can also adopt a configuration in which the cooling liquid having flowed along one of the light incidence side and the light emission side flows along another region in the housing 51, and then flows along the other thereof as in the case of the cooling device 5E.

Further, as in the cooling device 5F, it is possible for the cooling device 5L to be configured so that the cooling liquid flows along one of the +Y direction and the −Y direction on the light incidence side of each of the light modulation devices 453, and flows along the other of the +Y direction and the −Y direction on the light emission side. Also in the cooling device having such a configuration, it is also possible to adopt a configuration in which the cooling liquid having flowed on one of the light incident side and the light emission side flows along another region in the housing 51, and then flows on the other thereof as described above.

Modifications of Embodiments

The invention is not limited to each of the embodiments described above, but includes modifications, improvements, and so on in the range in which the advantages of the invention can be achieved.

For example, it is also possible to combine the configurations of the cooling devices 5A through 5L described above with each other. Citing one example, it is also possible to combine any one of the cooling devices 5A through 5D, one of the cooling devices 5E, 5F, the cooling device 5G, one of the cooling devices 5H, 5I, the cooling device 5J, and one of the cooling devices 5I, 5L with each other. Further, it is also possible to combine the content and the configuration shown as the modifications of the cooling device in each of the embodiments described above with other cooling devices.

It is assumed that the control device 6 is located on the +Y direction side with respect to the cooling devices 5A through 5L, the side surface part 513 of the housing 51, 51J of each of the cooling devices 5A through 5L has the connection sections 5131 as the first connection section to which the signal lines SL extending from the respective light modulation devices 453 are connected, and the connection section 5132 as the second connection section to which the signal line 61 extending from the control device 6 is connected, and the connection sections 5131, 5132 are electrically connected to each other. However, this is not a limitation, and it is also possible for the control device to be disposed at a position distant from the cooling device. Further, it is also possible that the side surface part 513 has an opening section through which the signal lines SL or the signal line 61 is inserted instead of these connection sections 5131, 5132, and a sealing member such as a packing for sealing between an end edge of the opening section and the signal lines SL, 61 is provided.

It is assumed that the external cooling mechanism 54 has the pipes 541, the retaining section 542, the pressure-feeding section 543 and the heat receiving section 544, and it is also assumed that the external cooling mechanism 56 has the pipes 561, the retaining section 562, the pressure-feeding section 563 and the heat receiving section 564. However, this is not a limitation, the configuration of the external cooling mechanism 54 does not matter providing the cooling liquid as the first cooling liquid in the housing 51 can be cooled outside the housing 51. Similarly, the configuration of the external cooling mechanism 56 does not matter providing the cooling liquid as the second cooling liquid in the external housing 55 can be cooled outside the external housing 55 and the housing 51. Further, the order in which the cooling liquid flows along the retaining section 542, 562, the pressure-feeding section 543, 563 and the heat receiving section 544, 564 disposed in the flow channel of the cooling liquid in each of the external cooling mechanisms 54, 56 can arbitrarily be changed. In other words, the arrangement of the retaining section 542, 562, the pressure-feeding section 543, 563 and the heat receiving section 544, 564 in the flow channel of the cooling liquid can also be changed arbitrarily. On the other hand, in the case in which a gas is encapsulated in the space SP in the external housing 55 as in the cooling device 5H, it is also possible to provide a configuration of cooling the gas outside the external housing 55 and the housing 51.

Further, it is assumed that the cooling liquid encapsulated in the space SP of the external housing 55 is higher in heat transfer coefficient than the cooling liquid located inside the housing 51. However, this is not a limitation, and the cooling liquid located inside the external housing 55 can arbitrarily be selected.

It is assumed that the pressure in the space SP in the external housing 55 is higher than the pressure in the space in the housing 51. However, this is not a limitation, and the pressure in the external housing 55 is not necessarily required to be higher than the pressure in the housing 51 as long as the cooling liquid in the housing 51 is not leaked outside the housing 51.

It is assumed that the housing 51J has the restriction section 51J2 located outside (outside the light beam passage area PA) of the light passing through the opening section 511E and connected to the light emission surface 455E of the light combining device 455, and the restriction section 51J2 prevents the cooling liquid from flowing between the light emission surface 455E and the projection optical device 46. The configuration of the restriction section having such a function can be another configuration.

It should be noted that the side surface part 51J1 has contact with the incident side polarization plate 452, the light modulation device 453B and the emission side polarization plate 454 through which the blue light LB passes, and the incident side polarization plate 452, the light modulation device 453R and the emission side polarization plate 454 through which the red light LR passes in the example shown in FIG. 14, but is not necessarily required to have contact therewith. It is also possible to adopt a configuration in which, for example, the side surface part 51J1 is separated from the incident side polarization plates 452, the light modulation devices 453B, 453R and the emission side polarization plates 454 with a predetermined amount of gap in the +Z direction side, and the restriction section 51J2 extends from the side surface part 51J1 toward the −Z direction to be connected to the light combining device 455.

In the cooling device 5J, it is assumed that, for example, the dimension L2 between the emission side polarization plate 454 and the plane of incidence of light 455R along the light path of the red light LR is smaller than the dimension L1 between the light modulation device 453P and the emission side polarization plate 454. However, this is not a limitation, and the dimension L2 can also be equal to or larger than the dimension L1. The same applies to the light modulation devices 453, the emission side polarization plates 454 and the light combining device 455 which the other colored light beams LB, LG respectively pass through. On the other hand, in view of the problem of the resolution unevenness described above, it is preferable for the dimension between the light modulation device 453 and the emission side polarization plate 454 to be uniformed between the light paths of the respective colored light beams LB, LG, and LR, and it is preferable for the dimension between the emission side polarization plate 454 and the light combining device 455 to be uniformed between the light paths of the respective colored light beams LB, LG, and LR. By arranging the light modulation devices 453, the emission side polarization plates 454 and the light combining device 455 in such a manner, it is possible to more surely prevent the resolution unevenness described above from being observed in the image displayed.

In each of the embodiments described above, it is assumed that the opening sections 511B, 511G, 511R, and 511E of the housing 51, 51J are each closed by the light transmissive member 512. Such a light transmissive member 512 can be a wave plate as described above, or can also be an optical filter for transmitting the light passing through the corresponding opening section. For example, the light transmissive member 512 provided to the opening section 511G can also be an optical filter for transmitting the green light LG while inhibiting the transmission of other colored light beams. The same applies to other light transmissive members.

In each of the embodiments described above, it is assumed that the incident side polarization plates 452, the light modulation devices 453 and the emission side polarization plates 454 which the colored light beams respectively pass through, and the light combining device 455 are disposed inside or outside the housing 51, 51J. Specifically, in each of the embodiments described above, there is shown an example in which the light modulation devices 453, the emission side polarization plates 454 and the light combining device 455 are disposed inside the housing 51, 51J, and the incident side polarization plates 452 are disposed inside or outside the housing 51, 51J. However, this is not a limitation. For example, it is possible to exclude at least one of the incident side polarization plates 452, the light modulation devices 453, the emission side polarization plates 454 and the light combining device 455 from the cooling target by the cooling device.

Further, the cooling target by the cooling liquid in the housing is not required to be the whole of the image forming unit FU, and can also be a part of the image forming unit FU. For example, in a general projector, the green light LG is higher in light intensity than other colored light beams LB, LR, and the light modulation device 453G is apt to rise in temperature compared to the other light modulation devices 453B, 453R. Therefore, it is also possible to adopt a configuration in which only the light modulation device 453G is dipped in the cooling liquid. Further, in the emission side polarization plates 454, it is necessary to more effectively cool the emission side polarization plate 454 which the blue light LB enters. Therefore, it is also possible to adopt a configuration in which only the emission side polarization plate 454 which the blue light LB enters is dipped in the cooling liquid. Further, the flow speeds of the cooling liquid flowing along the respective light modulation devices 453 are not limited to the same flow speed, but can arbitrarily be changed in accordance with the characteristics of the light modulation devices 453 and the incident light intensity.

Further, it is also possible for the light modulation device adopted in each of the embodiments described above to have a drive section (e.g., a drive IC (integrated circuit)) for driving a plurality of display elements (pixels) in the light modulation device in accordance with the image information input to the light modulation device in each of the signal lines to be connected to the control device 6. In particular, the light modulation device capable of forming a high-resolution image such as 4K or 8K has such a configuration in some cases. These drive sections generate heat when driving the display elements of the light modulation device. Therefore, according to the cooling device in each of the embodiments described above, even in the case in which such light modulation devices are adopted as the light modulation devices 453 described above, it is possible to efficiently cool the drive sections attached to the signal lines SL of the light modulation devices 453.

In each of the embodiments described above, it is assumed that the projector is equipped with the three light modulation devices 453 (453B, 453G, and 453R) each having a liquid crystal panel. However, this is not a limitation, and the invention can also be applied to a projector equipped with two or less, or four or more light modulation devices.

In each of the embodiments described above, there is illustrated the configuration in which the image projection device 4 has the layout and the optical components shown in FIG. 1. However, this is not a limitation, but it is also possible to adopt the image projection device 4 having a different layout and other optical components.

In each of the embodiments described above, it is assumed that the light modulation devices 453 are each provided with the transmissive type liquid crystal panel having the plane of incidence of light and the light emission surface different from each other. However, this is not a limitation, but it is also possible to adopt a configuration in which the light modulation devices 453 each have a reflective type liquid crystal panel having the plane of incidence of light and the light emission surface coinciding with each other. Further, it is also possible to use a light modulation device other than the liquid crystal, such as a device using a mirror device such as a digital micromirror device (DMD) providing the light modulation device is capable of modulating the incident light beam to form the image corresponding to the image information.

The entire disclosure of Japanese Patent Application No. 2017-186773, filed Sep. 27, 2017 and No. 2018-108313, filed Jun. 6, 2018 are expressly incorporated by reference herein.

What is claimed is:

1. A projector comprising:
a light source device;
a plurality of light modulation devices each adapted to modulate a light beam emitted from the light source device;
a light combining device adapted to combine the light beams respectively modulated by the plurality of light modulation devices;
a projection optical device adapted to project the light beam combined by the light combining device;
a housing in which the plurality of light modulation devices and the light combining device are disposed, the housing having a first cooling liquid encapsulated inside;
an external housing surrounding the housing and having a space with positive pressure inside;
a stirring device including a rotating shaft and an impeller and being adapted to stir the first cooling liquid inside the housing; and
a control device disposed outside the housing and electrically connected to the housing, the control device adapted to control the plurality of light modulation devices,
wherein the housing includes a connection section electrically connecting the control device and a plurality of light modulation device side signal lines, which are respectively extending from the plurality of light modulation devices, to each other,
wherein a second cooling liquid is encapsulated in the space between the housing and the external housing, and
wherein a heat transfer coefficient of the second cooling liquid is higher than a heat transfer coefficient of the first cooling liquid.

2. The projector according to claim 1, wherein:
the housing includes a first connection section and a second connection section that is different from the first connection section,
the first and second connection sections of the housing are electrically connected to each other,
the plurality of light modulation device side signal lines are electrically connected to the first connection section of the housing,
the control device is electrically connected to the second connection section of the housing, and
the control device and the plurality of light modulation device side signal lines are electrically connected to each other through the first and second connection sections of the housing.

3. The projector according to claim 1, further comprising:
a first pipe connected to the housing, the first pipe through which the first cooling liquid flows;
a first retaining section disposed outside the housing, the first retaining section adapted to retain the first cooling liquid inflowing via the first pipe;
a first heat receiving section disposed outside the housing, the first heat receiving section adapted to receive heat from the first cooling liquid inflowing via the first pipe; and
a first pressure-feeding section disposed outside the housing, the first pressure-feeding section adapted to pressure-feed the first cooling liquid inflowing via the first pipe toward the housing.

4. A projector comprising:
a light source device;
a plurality of light modulation devices each adapted to modulate a light beam emitted from the light source device;
a light combining device adapted to combine the light beams respectively modulated by the plurality of light modulation devices;
a projection optical device adapted to project the light beam combined by the light combining device;
a housing in which the plurality of light modulation devices and the light combining device are disposed, the housing having a first cooling liquid encapsulated inside;
a stirring device including a rotating shaft and an impeller and being adapted to stir the first cooling liquid inside the housing;
a control device disposed outside the housing and electrically connected to the housing, the control device adapted to control the plurality of light modulation devices,
wherein the housing includes a connection section electrically connecting the control device and a plurality of light modulation device side signal lines, which are respectively extending from the plurality of light modulation devices, to each other;

an external housing surrounding the housing and having a space with positive pressure inside, the external housing having a second cooling liquid encapsulated in the space between the housing and the external housing;
a second pipe connected to the external housing, the second pipe through which the second cooling liquid flows;
a second retaining section disposed outside the external housing, the second retaining section adapted to retain the second cooling liquid inflowing via the second pipe;
a second heat receiving section disposed outside the external housing, the second heat receiving section adapted to receive heat from the second cooling liquid inflowing via the second pipe; and
a second pressure-feeding section disposed outside the external housing, the second pressure-feeding section adapted to pressure-feed the second cooling liquid inflowing via the second pipe toward the external housing.

5. The projector according to claim 1, wherein the housing has a restriction section adapted to restrict inflow of the first cooling liquid between the light combining device and the projection optical device.

6. A projector comprising:
a light source device;
a plurality of light modulation devices each adapted to modulate a light beam emitted from the light source device;
a light combining device adapted to combine the light beams respectively modulated by the plurality of light modulation devices;
an optical component located between the light combining device and a target light modulation device of the plurality of light modulation devices, the optical component which the light emitted from the target light modulation device enters;
a projection optical device adapted to project the light beam combined by the light combining device;
a housing in which the plurality of light modulation devices and the light combining device are disposed, the housing having a first cooling liquid encapsulated inside;
a stirring device including a rotating shaft and an impeller and being adapted to stir the first cooling liquid inside the housing; and
a control device disposed outside the housing and electrically connected to the housing, the control device adapted to control the plurality of light modulation devices,
wherein the housing includes a connection section electrically connecting the control device and a plurality of light modulation device side signal lines, which are respectively extending from the plurality of light modulation devices, to each other,
wherein the housing includes
    a first flow channel in which the first cooling liquid flows along the target light modulation device and the optical component between the target light modulation device and the optical component, and
    a second flow channel in which the first cooling liquid flows along the optical component and the light combining device between the optical component and the light combining device, and
wherein a dimension in the second flow channel between the optical component and the light combining device along a light path of the light emitted from the target light modulation device is smaller than a dimension in the first flow channel between the target light modulation device and the optical component along the light path.

7. The projector according to claim 1, wherein
in a case in which, in each of the plurality of light modulation devices, a region adapted to modulate light corresponding to an area on a one-end side of an entering light beam in a direction is defined as a one-end side region, the entering light beam entering the projection optical device from the light combining device, the direction being perpendicular to a proceeding direction of the entering light beam and being parallel to a proceeding direction of at least one of the light beams which enter each of the plurality of light modulation devices, and
in a case in which, in each of the plurality of light modulation devices, a region adapted to modulate light corresponding to an area on a the-other-end side of the entering light beam is defined as a the-other-end side region,
a flow direction of the first cooling liquid flowing along a surface on a light incidence side in each of the plurality of light modulation devices is substantially the same among the plurality of light modulation devices in a direction of connecting the one-end side region and the the-other-end side region to each other.

8. The projector according to claim 1, wherein
in a case in which, in each of the plurality of light modulation devices, a region adapted to modulate light corresponding to an area on a one-end side of an entering light beam in a direction is defined as a one-end side region, the entering light beam entering the projection optical device from the light combining device, the direction being perpendicular to a proceeding direction of the entering light beam and being parallel to a proceeding direction of at least one of the light beams which enter each of the plurality of light modulation devices, and
in a case in which, in each of the plurality of light modulation devices, a region adapted to modulate light corresponding to an area on a the-other-end side of the entering light beam is defined as a the-other-end side region,
a flow direction of the first cooling liquid flowing along a surface on a light emission side in each of the plurality of light modulation devices is substantially the same among the plurality of light modulation devices in a direction of connecting the one-end side region and the the-other-end side region to each other.

9. The projector according to claim 1,
wherein a flow speed of the first cooling liquid flowing along each of the plurality of light modulation devices is substantially the same among the plurality of light modulation devices.

10. The projector according to claim 1,
wherein the first cooling liquid flows on a light incidence side and a light emission side of each of the plurality of light modulation devices, and
wherein a flow direction of the first cooling liquid flowing on the light incidence side of each of the plurality of light modulation devices is opposite to a flow direction of the first cooling liquid flowing on the light emission side of each of the plurality of light modulation devices.

11. The projector according to claim 1,
wherein the first cooling liquid is a fluorine-based inert fluid.

12. The projector according to claim 2, wherein:
the first connection section is disposed at an inner surface side of the housing,
the second connection section is disposed at an outer surface side of the housing, and
the first and second connection sections are electrically connected to each other at the housing.

13. The projector according to claim 4,
wherein the first cooling liquid flows on a light incidence side and a light emission side of each of the plurality of light modulation devices, and
wherein a flow direction of the first cooling liquid flowing on the light incidence side of each of the plurality of light modulation devices is opposite to a flow direction of the first cooling liquid flowing on the light emission side of each of the plurality of light modulation devices.

14. The projector according to claim 1, further comprising:
an optical component located between the light combining device and a target light modulation device of the plurality of light modulation devices, the optical component which the light emitted from the target light modulation device enters,
wherein the housing includes
a first flow channel in which the first cooling liquid flows along the target light modulation device and the optical component between the target light modulation device and the optical component, and
a second flow channel in which the first cooling liquid flows along the optical component and the light combining device between the optical component and the light combining device, and
wherein a dimension in the second flow channel between the optical component and the light combining device along a light path of the light emitted from the target light modulation device is smaller than a dimension in the first flow channel between the target light modulation device and the optical component along the light path.

15. The projector according to claim 4, further comprising:
an optical component located between the light combining device and a target light modulation device of the plurality of light modulation devices, the optical component which the light emitted from the target light modulation device enters,
wherein the housing includes
a first flow channel in which the first cooling liquid flows along the target light modulation device and the optical component between the target light modulation device and the optical component, and
a second flow channel in which the first cooling liquid flows along the optical component and the light combining device between the optical component and the light combining device, and
wherein a dimension in the second flow channel between the optical component and the light combining device along a light path of the light emitted from the target light modulation device is smaller than a dimension in the first flow channel between the target light modulation device and the optical component along the light path.

* * * * *